US012041338B1

(12) United States Patent
Richter

(10) Patent No.: US 12,041,338 B1
(45) Date of Patent: Jul. 16, 2024

(54) PERSONALIZED CONTENT CREATION

(71) Applicant: Apple Inc., Cupertino, CA (US)

(72) Inventor: Ian M. Richter, Los Angeles, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/381,972

(22) Filed: Jul. 21, 2021

Related U.S. Application Data

(60) Provisional application No. 63/082,225, filed on Sep. 23, 2020.

(51) Int. Cl.
H04N 5/232 (2006.01)
H04N 23/61 (2023.01)
H04N 23/62 (2023.01)
H04N 23/63 (2023.01)

(52) U.S. Cl.
CPC ........... H04N 23/633 (2023.01); H04N 23/61 (2023.01); H04N 23/62 (2023.01); H04N 23/632 (2023.01)

(58) Field of Classification Search
CPC ............. G06Q 501/01; H04N 5/23238; H04N 5/23216; H04N 5/232411; H04N 5/23206; H04N 5/23219; H04N 5/23222; H04N 5/23218; H04N 5/232939; H04N 5/232935; G06T 1/0007; G06T 1/00; G06F 3/01; G06F 3/04883; G01B 11/00; G03B 15/006; G03B 37/00; G03B 2215/00; G06V 40/174; G01S 17/89
USPC .................................................... 348/333.02
See application file for complete search history.

(56) References Cited

U.S. PATENT DOCUMENTS

| | | | |
|---|---|---|---|
| 8,422,852 B2 | 4/2013 | Suri et al. | |
| 8,587,670 B2* | 11/2013 | Wood | H04N 1/2112 |
| | | | 348/222.1 |
| 8,885,963 B2 | 11/2014 | Coleman | |
| 9,596,398 B2* | 3/2017 | Khawand | H04N 23/6812 |
| 9,794,441 B2* | 10/2017 | Eom | H04N 23/631 |
| 9,824,477 B1* | 11/2017 | McDonald | H04N 1/00244 |

(Continued)

OTHER PUBLICATIONS

"Create movies, animations and collages," Retrieved from the Internet on May 8, 2020: https://support.google.com/photos/answer/6128862?co=GENIE.Platform, 1 Page.

(Continued)

Primary Examiner — Pritham D Prabhakher
(74) Attorney, Agent, or Firm — Fernando & Partners, LLP

(57) ABSTRACT

Various implementations disclosed herein include devices, systems, and methods for capturing a new media content item. In various implementations, a device includes a display, one or more processors and a non-transitory memory. In some implementations, a method includes determining a plot template for generating a media content item based on other media content items that are distributed temporally. In some implementations, the plot template is defined by a set of one or more conditional triggers for capturing the other media content items. In some implementations, the method includes determining that a condition associated with a first conditional trigger of the set of one or more conditional triggers is satisfied. In some implementations, the method includes in response to the condition associated with the first conditional trigger being satisfied, displaying, on the display, a notification to capture a new media content item for populating the plot template.

45 Claims, 27 Drawing Sheets

(56) References Cited

U.S. PATENT DOCUMENTS

| | | | |
|---|---|---|---|
| 10,116,861 B1* | 10/2018 | Graham | G06V 10/255 |
| 10,334,158 B2 | 6/2019 | Gove | |
| 10,362,340 B2* | 7/2019 | Ramadorai | H04N 21/84 |
| 10,367,987 B2* | 7/2019 | Hennings | H04N 23/675 |
| 10,382,673 B2* | 8/2019 | Upendran | H04N 5/23222 |
| 10,425,578 B1* | 9/2019 | Westheimer | H04N 23/62 |
| 10,440,263 B2* | 10/2019 | Long | G06F 1/1647 |
| 10,574,881 B2* | 2/2020 | Oleson | H04N 5/23216 |
| 10,958,829 B2* | 3/2021 | Oleson | H04N 5/23222 |
| 11,064,106 B2* | 7/2021 | Winer | H04N 23/631 |
| 11,397,977 B1* | 7/2022 | Swett | G06V 20/30 |
| 2006/0114327 A1 | 6/2006 | Araya et al. | |
| 2009/0079844 A1* | 3/2009 | Suzuki | H04N 23/67 348/222.1 |
| 2010/0171846 A1* | 7/2010 | Wood | H04N 1/2112 348/222.1 |
| 2010/0220899 A1* | 9/2010 | Steinberg | G06F 18/00 382/118 |
| 2010/0309335 A1* | 12/2010 | Brunner | H04N 5/781 348/E5.031 |
| 2011/0069180 A1* | 3/2011 | Nijemcevic | H04N 1/00307 348/333.12 |
| 2011/0314049 A1* | 12/2011 | Poirier | H04N 23/64 382/218 |
| 2011/0317031 A1* | 12/2011 | Honda | H04N 23/64 348/E5.037 |
| 2013/0057713 A1* | 3/2013 | Khawand | H04N 23/80 348/208.1 |
| 2017/0374280 A1* | 12/2017 | Chan | H04N 1/00183 |
| 2018/0060690 A1* | 3/2018 | Lee | H04N 5/265 |
| 2018/0198976 A1* | 7/2018 | Upendran | H04N 23/633 |
| 2018/0295396 A1* | 10/2018 | Ramadorai | H04N 21/2743 |
| 2018/0332216 A1* | 11/2018 | Long | G06F 1/1618 |
| 2019/0253614 A1* | 8/2019 | Oleson | H04N 5/23216 |
| 2019/0320113 A1* | 10/2019 | Rajvanshi | H04N 23/64 |
| 2020/0065602 A1* | 2/2020 | Ionita | H04N 23/611 |
| 2020/0154037 A1* | 5/2020 | Oleson | H04N 5/23222 |
| 2020/0167549 A1* | 5/2020 | Taoka | A61B 5/6887 |
| 2020/0349370 A1* | 11/2020 | Lambert | G06V 20/20 |
| 2021/0299651 A1* | 9/2021 | Mccord | G01J 3/0286 |

OTHER PUBLICATIONS

Phantom, "Image-Based Auto-Trigger," Ametek Materials Analysis Division, Jul. 2012, Retrieved from the Internet: www.visionresearch.com, pp. 1-3.

"PicPlayPost Movie Video Editor," Retrieved from the Internet on May 8, 2020: https://apps.apple.com/US/picplaypost-movie-video-editor/id498127541, pp. 1-4.

* cited by examiner

PERSONALIZED CONTENT CREATION

CROSS-REFERENCE TO RELATED APPLICATION

This application claims the benefit of U.S. Provisional Patent App. No. 63/082,225, filed on Sep. 23, 2020, which is incorporated by reference in its entirety.

TECHNICAL FIELD

The present disclosure generally relates to personalized content creation.

BACKGROUND

Some devices are capable of capturing content. For example, some devices include cameras that allow a user to capture images or videos. Some devices allow a user to generate a new content item by combining existing content items. For example, some devices allow a user to create a collage of existing images. However, the user may sometimes forget to capture an image or a video thereby resulting in fewer images or videos available for generating a new content item. Additionally, a user may be biased towards capturing certain types of images or videos thereby creating a lack of diversity in the types of existing content items.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
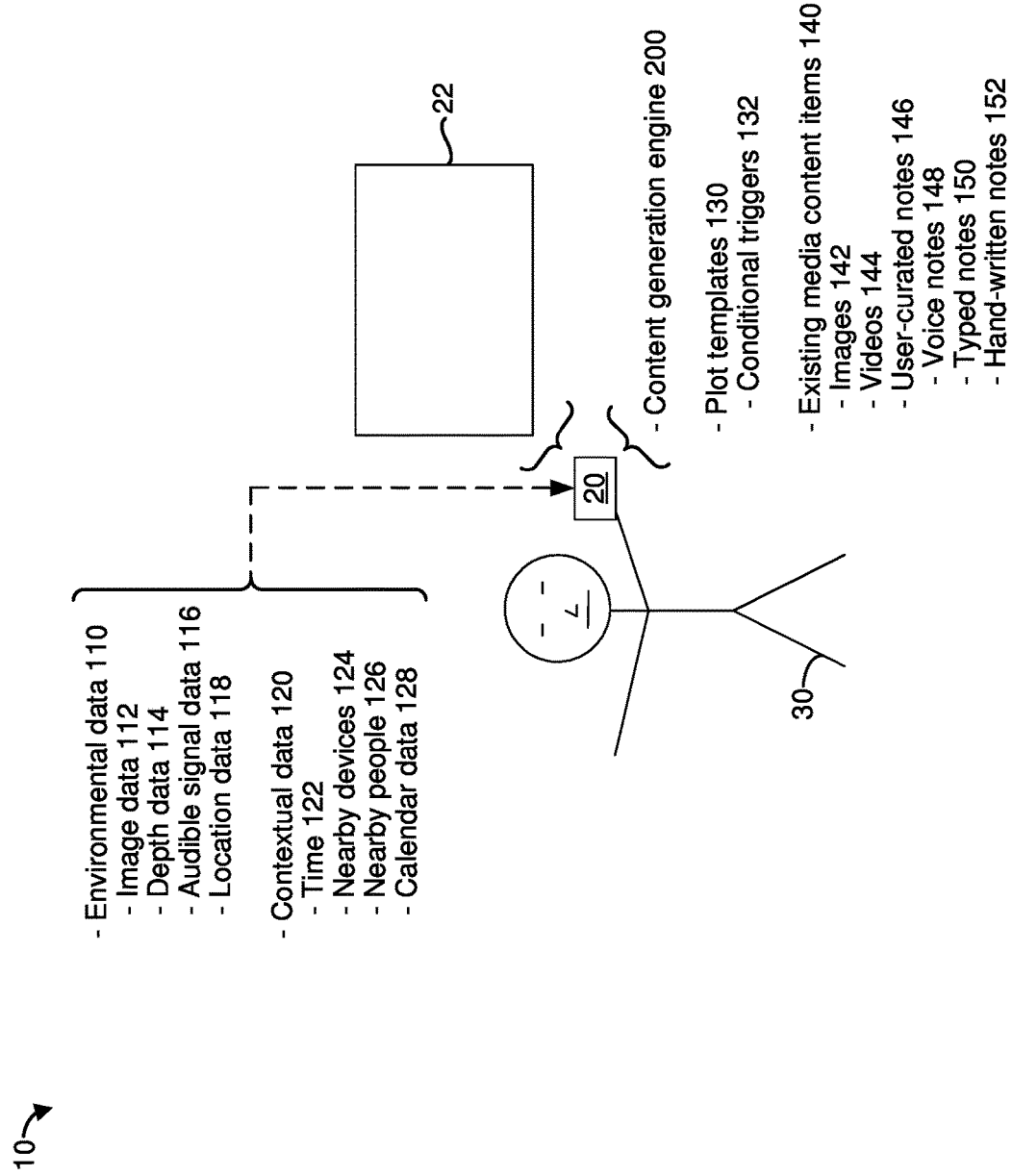
FIGS. 1A-1H are diagrams of an example operating environment for capturing content in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for capturing a new media content item. In various implementations, a device includes a display, one or more processors and a non-transitory memory. In some implementations, a method includes determining a plot template for generating a media content item based on other media content items that are distributed temporally. In some implementations, the plot template is defined by a set of one or more conditional triggers for capturing the other media content items. In some implementations, the method includes determining that a condition associated with a first conditional trigger of the set of one or more conditional triggers is satisfied. In some implementations, the method includes in response to the condition associated with the first conditional trigger being satisfied, displaying, on the display, a notification to capture a new media content item for populating the plot template.

Various implementations disclosed herein include devices, systems, and methods for synthesizing a new media content item. In various implementations, a device includes one or more processors and a non-transitory memory. In some implementations, a method includes obtaining a request to synthesize a new media content item based on a plurality of existing media content items associated with a user of the device. In some implementations, the request is associated with a plot template. In some implementations, the method includes selecting, based on the plot template, a subset of the plurality of existing media content items. In some implementations, the method includes synthesizing the new media content item by ordering the subset of the plurality of existing media content items in a sequence that satisfies the plot template.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Some devices do not guide users on when to take pictures or videos. Without guidance, pictures or videos captured by the user are sometimes non-diversified with respect to the types of camera shot because users tend to gravitate towards a preferred type of camera shot. For example, users that like to capture photos in portrait mode with natural lighting tend to take portraits with the natural light setting. Additionally, without guidance, pictures or videos captured by the user are often non-diversified with respect to the objects or environments that are photographed or filmed. For example, some users may capture too many pictures of food or beverages.

When the device is synthesizing a new media content item by populating a plot template with existing photos or videos, the existing photos or videos may not be sufficient to populate the plot template. For example, the plot template may require a panoramic photo, a photo taken with flash, and a portrait captured with contour lighting. However, the existing photos may only include portraits captured with natural light. As such, the device may be unable to populate the plot template and generate a new media content item based on the existing photos or videos.

The present disclosure provides methods, systems, and/or devices for displaying a notification to capture a new media content item for populating a plot template. The device can prompt the user to capture new photos or videos that are likely to satisfy a plot template that the device is populating in order to deliver a specific experience. The device can provide guidance to the user on what to capture, when to capture and how to capture. For example, the device can provide a suggestion to capture a panoramic photograph when the sun is setting and the user is by the ocean.

The device can display a prompt to capture an image, a video or an audio clip when environmental conditions, indicated by environmental data, match a criterion associated with the plot template. For example, if the plot template requires a panoramic with the sun rising, the device displays a prompt to capture a panoramic when the device detects that the user is outside and the sun is rising. As another example, if the plot template requires an audio recording of birds chirping near the user's home in the morning, the device displays a prompt to capture an audio recording when the device detects a sound that corresponds to birds chirping.

The device can generate a list of images, videos or sound recordings that are required to populate the plot template. As the device captures images, videos or sound recordings on the list, the device updates the list to remove the captured media content items from the list. The device can identify the required media content items based on existing media content items. For example, the device can generate a list of images based on existing images that are stored in a photo application. As an example, if the plot template requires a panoramic and the existing set of photos already includes a panoramic, the device does not prompt the user to capture another panoramic. However, if the existing set of photos does not include a panoramic, the device prompts the user to capture a new panoramic.

The device can provide guidance on how to capture the new media content item. For example, the device can provide a recommendation on how to capture a new image. As an example, the device can prompt the user to capture a panoramic. As another example, the device can prompt the user to capture a portrait with the studio lighting effect (e.g., instead of natural lighting). As another example, the device can prompt the user to capture a video at 0.5× zoom (e.g., instead of 1.0× zoom).

The device can provide guidance on where to capture a new media content item. For example, the device can recommend a type of environment where the user can capture a new picture. As an example, the device can recommend to take a family photo with a body of water (e.g., a lake or an ocean) in the background. As another example, the device can recommend to take a selfie at night with the city skyline as the background.

The device can provide guidance on what to focus on while capturing the new media content item. For example, the device can recommend to take a picture or a video of a particular object. As an example, if the user is taking a trip to Paris, the device can recommend taking a picture of the user with the Eiffel Tower in the background.

The device can automatically capture a new media content item that fits the plot template after obtaining consent from the user. The device can present the automatically-captured media content item to the user and provide the user with options to store or discard the automatically-captured media content item. If the user approves the automatically-captured media content item, the device stores the media content item. If the user rejects the automatically-captured media content item, the device discards the media content item.

FIG. 1A is a diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 20.

In some implementations, the electronic device 20 includes a handheld computing device that can be held by a user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) that can be worn around a head of the user 30, an electronic watch or a pair of headphones.

In some implementations, the electronic device 20 includes a display 22. In some implementations, the display 22 includes an optical see-through display. For example, the electronic device 20 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

In various implementations, the electronic device 20 includes a content generation engine 200. In some implementations, the electronic device 20 includes a set of computer-readable instructions corresponding to the content generation engine 200. Although the content generation engine 200 is shown as being integrated into the electronic device 20, in some implementations, the content generation engine 200 is separate from the electronic device 20. For example, in some implementations, the content generation engine 200 resides at another device (e.g., at a controller, a server or a cloud computing platform).

In some implementations, the electronic device 20 includes a set of one or more plot templates 130 and various existing media content items 140. In some implementations, the content generation engine 200 generates a new media content item by populating one of the plot templates 130 with a subset of the existing media content items 140.

In some implementations, the existing media content items 140 include images 142 (e.g., pictures captured by the user 30 using the electronic device 20). In some implementations, the existing media content items 140 include videos 144. In some implementations, the existing media content items 140 include user-curated notes 146. In some implementations, the user-curated notes 146 include voice notes 148 (e.g., voice memos recorded by the user 30). In some implementations, the user-curated notes 146 include typed notes 150 (e.g., notes typed by the user 30 in a note-taking application). In some implementations, the user-curated notes 146 include hand-written notes 152 (e.g., notes that the user 30 handwrote). In some implementations, the electronic device 20 captures the existing media content items 140 over a period of time (e.g., over numerous years). In some implementations, the existing media content items 140 relate to the user 30 (e.g., the existing media content items 140 include pictures or videos that depict the user 30).

In some implementations, the plot templates 130 are for generating respective types of media content items (e.g., respective types of personal documentaries). For example, in some implementations, a first one of the plot templates 130 is used for generating a poetic media content item (e.g., a poetic documentary). In some implementations, a second one of the plot templates 130 is used for generating an informative media content item (e.g., an informative documentary). In some implementations, a third one of the plot templates 130 is used for generating a persuasive media content item (e.g., a persuasive documentary). In some implementations, a fourth one of the plot templates 130 is used for generating a participatory media content item (e.g., a participatory documentary). In some implementations, a fifth one of the plot templates 130 is used for generating a performatory media content item (e.g., a performatory documentary).

In some implementations, each plot template 130 uses certain types of existing media content items 140 to generate a new media content item. For example, in some implementations, a poetic plot template uses, among other types of media content items, portrait images that illustrate facial expressions of the user 30 to generate a poetic documentary. As such, in various implementations, the content generation engine 200 provides notifications on when to capture media content items that the plot templates 130 use to generate new media content items.

In various implementations, the electronic device 20 obtains (e.g., detects) environmental data 110 that characterizes a physical environment of the electronic device 20 (e.g., the operating environment 10). In some implementations, the environmental data 110 indicates environmental conditions of the operating environment 10. In some implementations, the environmental data 110 includes image data 112 (e.g., a set of one or more images captured by a scene-facing camera of the electronic device 20). In some implementations, the environmental data 110 includes depth data 114 that is captured by a depth sensor (e.g., a depth camera) of the electronic device 20. In some implementations, the environmental data 110 includes audible signal data 116 that is captured by an audio sensor (e.g., a microphone) of the electronic device 20. In some implementations, the environmental data 110 includes location data 118 that indicates a location of the electronic device 20.

In various implementations, the electronic device 20 obtains contextual data 120 that indicates a context of the electronic device 20 or the user 30 of the electronic device 20. In some implementations, the contextual data 120 indicates a current time 122 ("time 122", hereinafter for the sake of brevity). In some implementations, the contextual data 120 indicates nearby devices 124. In some implementations, the electronic device 20 detects the nearby devices 124 based on beacons transmitted by the nearby devices 124. In some implementations, the contextual data 120 indicates nearby people 126. In some implementations, the electronic device 20 detects the nearby people 126 by identifying faces in the image data 112. In some implementations, the contextual data 120 includes calendar data 128. In some implementations, the calendar data 128 indicates current events or upcoming events.

In various implementations, the plot templates 130 are associated with respective conditional triggers 132 for capturing new media content items that the content generation engine 200 can use to populate the plot templates 130. As an example, a conditional trigger 132 for a plot template 130 for a vacation trip includes detecting that the electronic device 20 is located at a famous landmark. For example, the conditional trigger 132 for a plot template 130 for a vacation trip is satisfied if the user 30 is vacationing in Paris and the electronic device 20 is located at the Eiffel Tower.

Figure 1B:
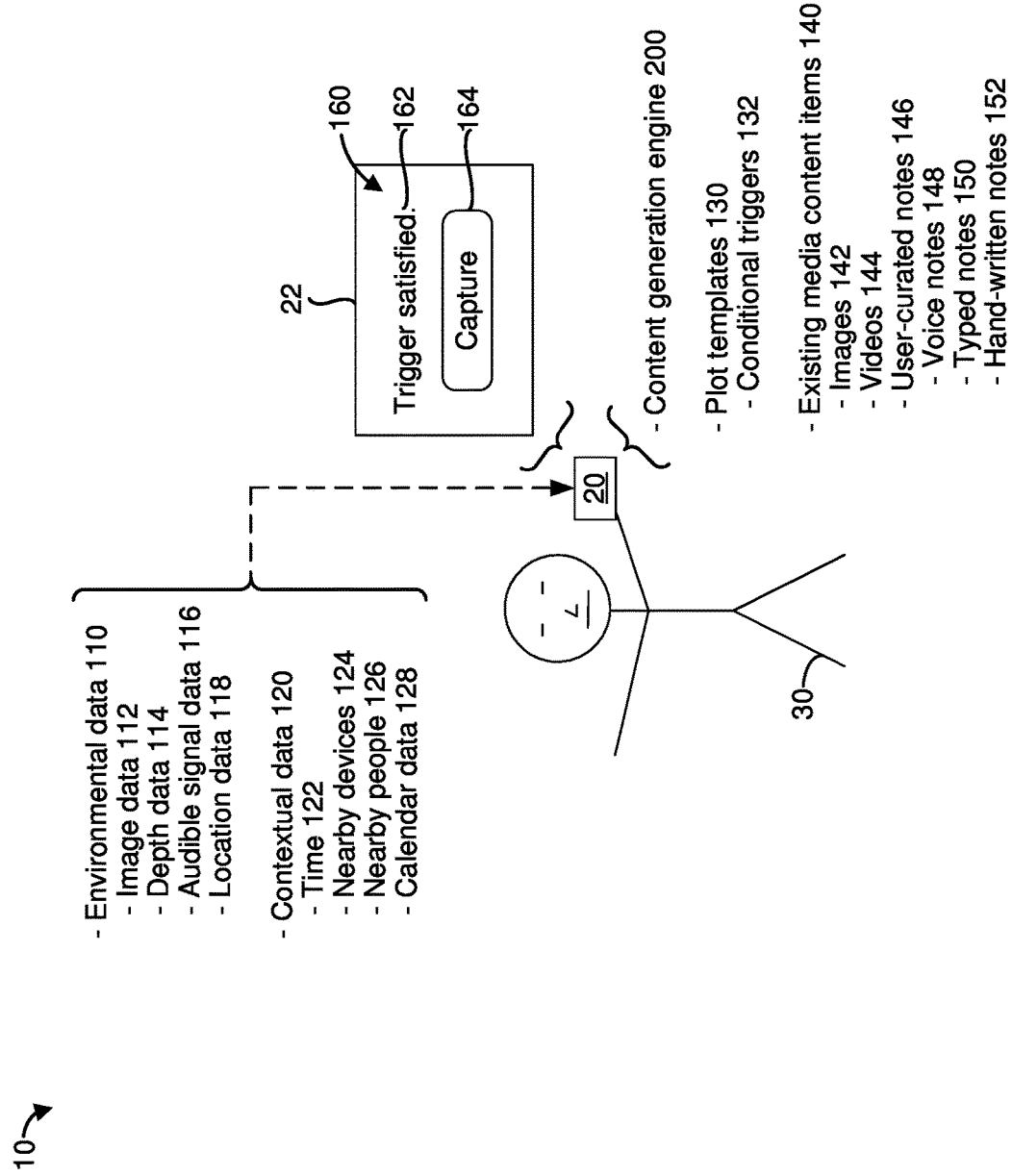

Referring to FIG. 1B, in various implementations, the content generation engine 200 displays a notification 160 when a conditional trigger 132 for a plot template 130 is satisfied. As an example, if the user 30 is vacationing in Paris, the content generation engine 200 displays the notification 160 when the location data 118 indicates that the electronic device 20 is located at the Eiffel Tower. In some implementations, the notification 160 includes text 162. In some implementations, the text 162 indicates that a particular one of the conditional triggers 132 has been satisfied. In some implementations, the notification 160 includes an affordance 164 for capturing a new media content item. In some implementations, the user 30 can select the affordance 164 to trigger the electronic device 20 to capture a new media content item that the content generation engine 200 can use to populate a plot template 130. For example, if the user 30 is vacationing in Paris and the content generation engine 200 displays the notification 160 when the electronic device 20 is at the Eiffel Tower, the user 30 can select the affordance 164 to capture a photo of the user 30 in front of the Eiffel Tower.

Figure 1C:
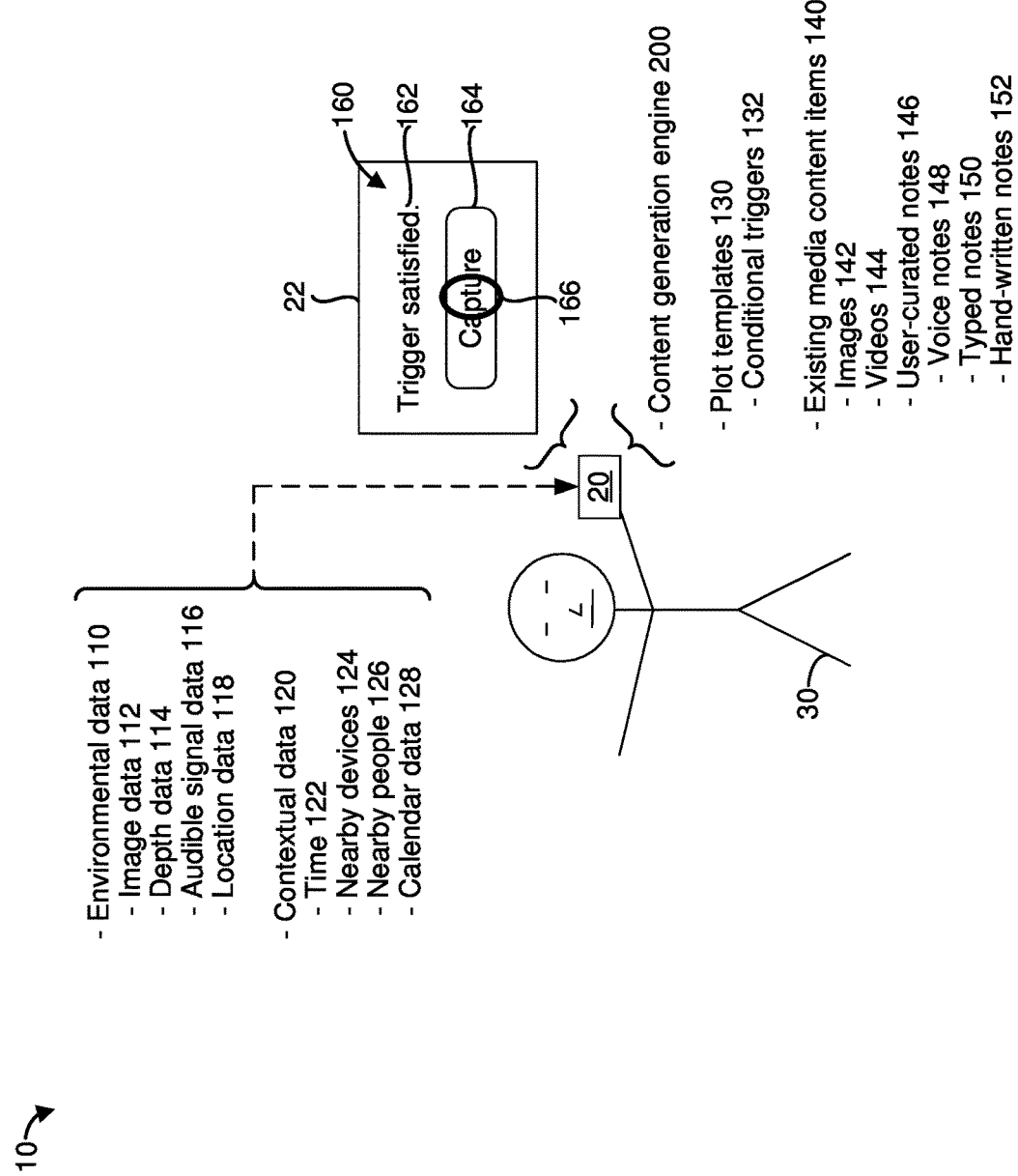

FIG. 1C illustrates a user input 166 directed to the affordance 164. For example, the user 30 taps the affordance 164 in order to capture a new media content item. In some implementations, the affordance 164 includes a photo capture affordance, and the user input 166 corresponds to a request to capture a new image (e.g., a new photo). In some implementations, the affordance 164 includes a video capture affordance, and the user input 166 corresponds to a request to capture a new video. In some implementations, the affordance 164 includes a sound capture affordance, and the user input 166 corresponds to a request to capture a new sound recording.

Figure 1D:
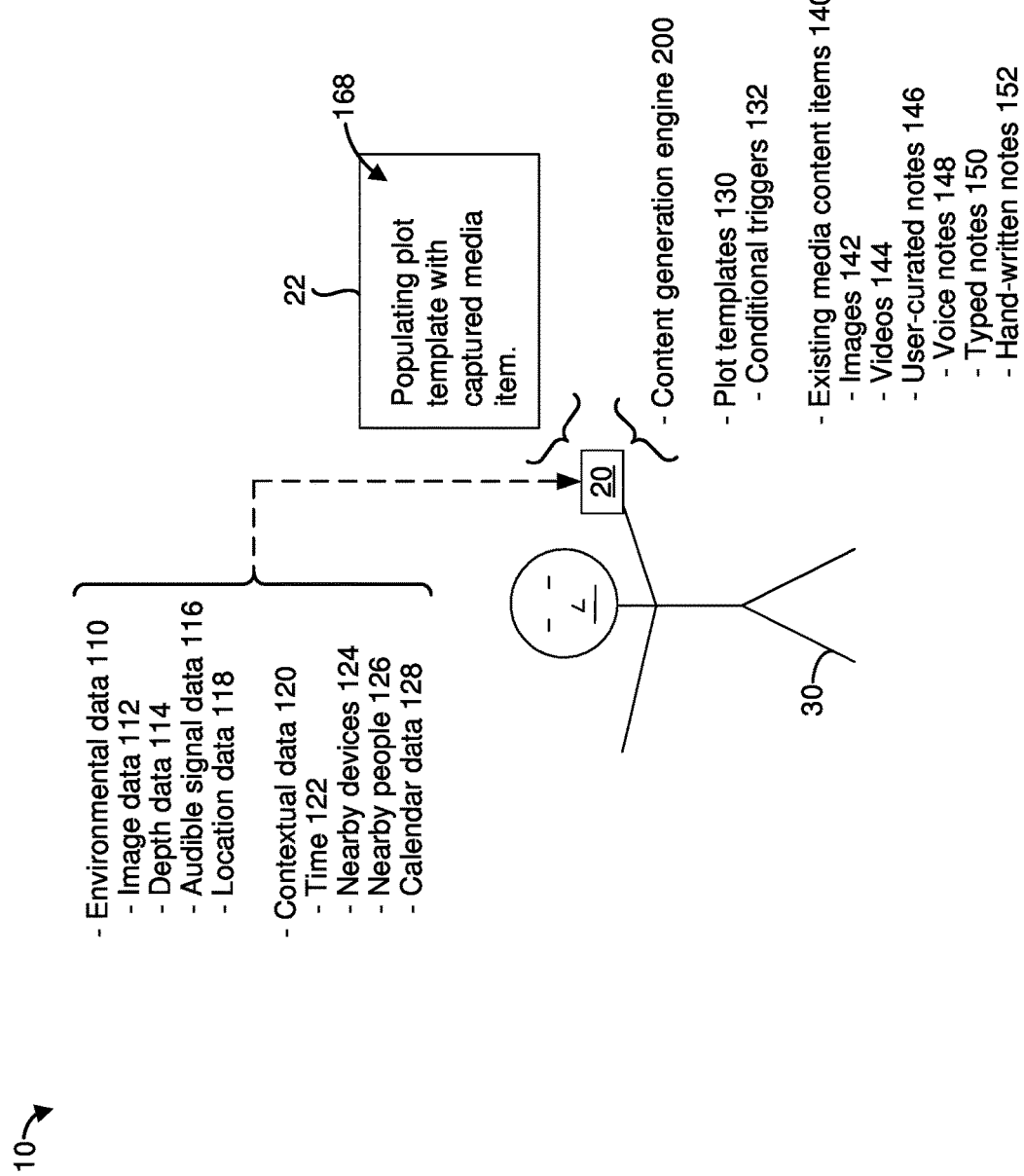

Referring to FIG. 1D, in some implementations, the electronic device 20 displays a media captured notification 168 in response to detecting the user input 166 directed to the affordance 164 shown in FIG. 1C. In some implementations, the media captured notification 168 indicates that the electronic device 20 has captured a new media content item as requested by the user 30. For example, in some implementations, the media captured notification 168 indicates that the electronic device 20 has captured a new image (e.g., a new photo). In some implementations, the media captured notification 168 indicates that the electronic device 20 has captured a new video. In some implementations, the media captured notification 168 indicates that the electronic device 20 has captured a new sound recording.

Figure 1E:
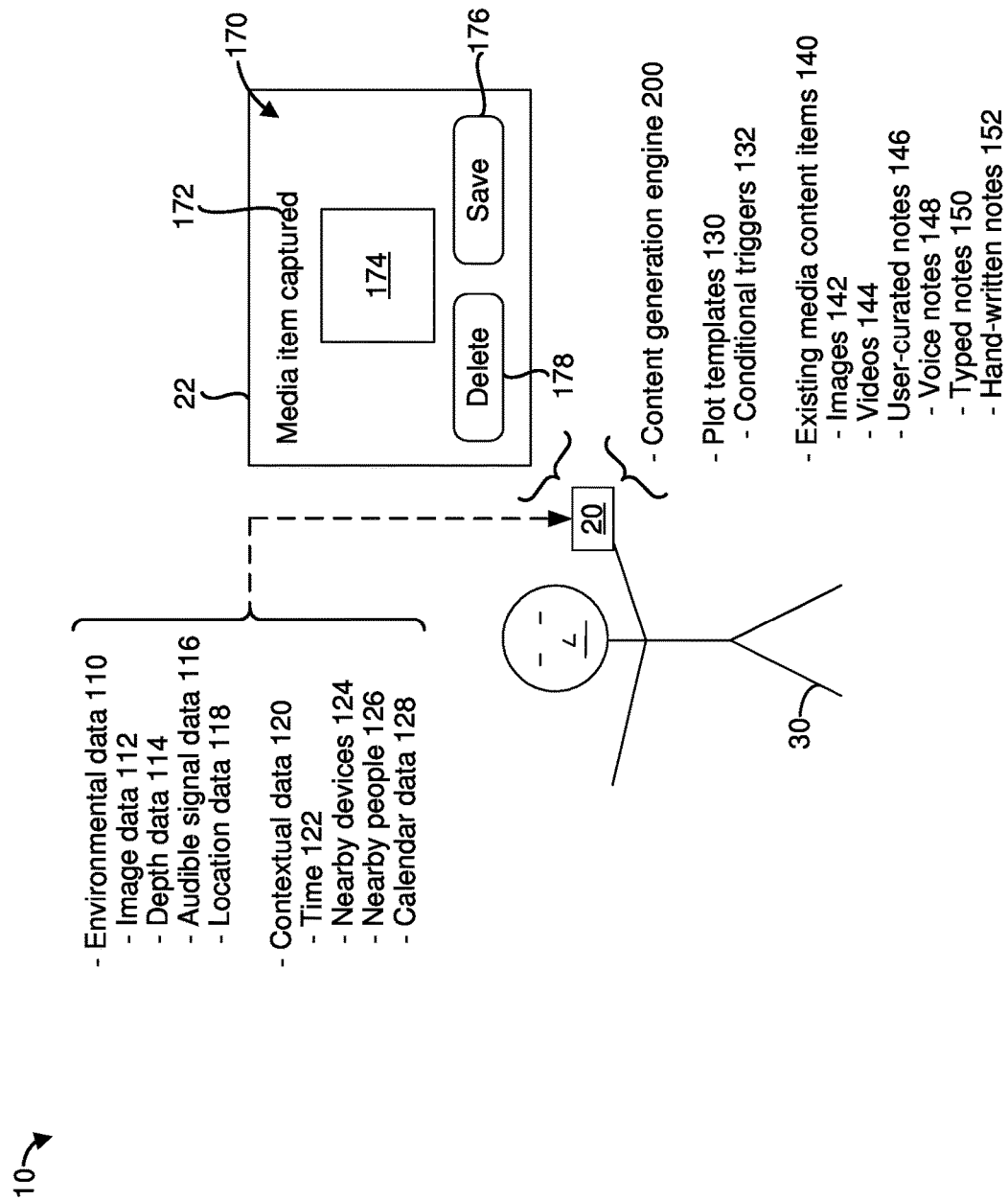

FIG. 1E illustrates another media captured notification 170. In some implementations, the media captured notification 170 displays text 172, a representation 174 of the newly-captured media content item, a save affordance 176 for saving the new media content item and a delete affordance 178 for deleting the new media content item. In some implementations, the electronic device 20 (e.g., the content generation engine 200) displays the media captured notification 170 after receiving the user input 166 shown in FIG. 1C and capturing the new media content item.

In some implementations, the electronic device 20 (e.g., the content generation engine 200) automatically captures a new media content item when a conditional trigger 132 for a plot template 130 is satisfied. For example, in some implementations, the content generation engine 200 captures the new media content item without requiring the user input 166 shown in FIG. 1C. In some implementations, the content generation engine 200 displays the media captured notification 170 in order to provide the user with an option to save the automatically-captured new media content item and an option to discard the automatically-captured new media content item. In some implementations, the electronic device 20 automatically captures new media content items after the user 30 provides informed consent to automatically capture new media content items. In some implementations, the electronic device 20 automatically captures new media content items in response to determining that the user 30 has opted for the electronic device 20 to automatically capture new media content items. In some implementations, the automatically-captured new media content items are stored locally on the electronic device 20 and not sent to another device via a public network (e.g., the Internet), for example, in order to maintain privacy of the user 30.

Figure 1F:
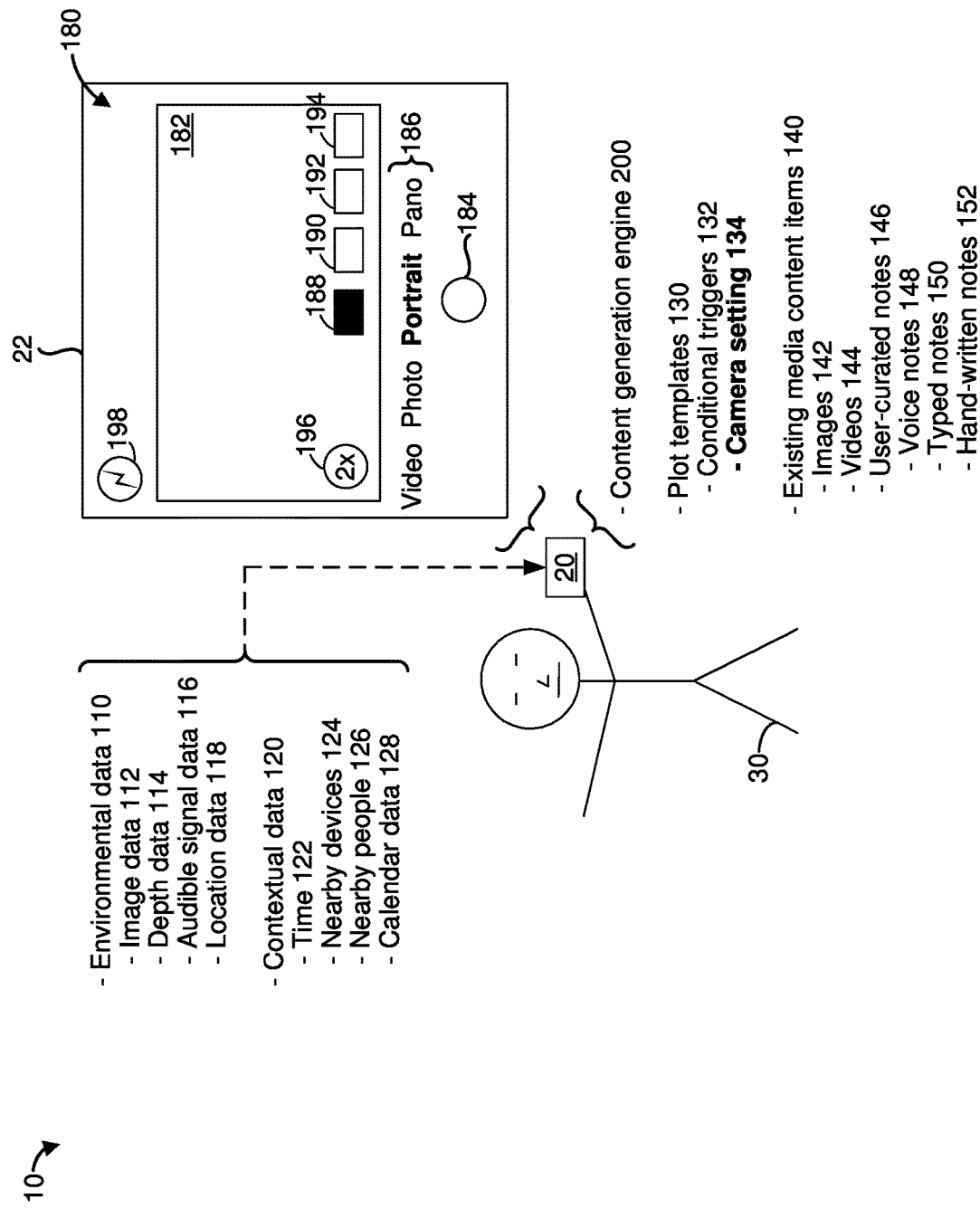

Referring to FIG. 1F, in some implementations, the content generation engine 200 displays a graphical user interface 180 for a camera application ("camera GUI 180", hereinafter for the sake of brevity). In some implementations, displaying the camera GUI 180 serves as a notification that a condition trigger 132 associated with a plot template 130 has been satisfied. In some implementations, the camera GUI 180 includes a viewfinder window 182 that displays a pass-through of a portion of the operating environment 10 that is in a field-of-view of the electronic device 20. In some implementations, the camera GUI 180 includes a capture affordance 184 that, when selected by the user 30, causes the electronic device 20 to capture an image. In some implementations, the camera GUI 180 includes media type affordances 186 that allow the user 30 to capture different types of media content items. In the example of FIG. 1F, the media type affordances 186 include a video affordance for capturing a video, a photo affordance for capturing an image, a portrait affordance for capturing a portrait image, a panoramic affordance for capturing a panoramic image.

In some implementations, the camera GUI 180 includes lighting affordances for selecting respective lighting effects. In the example of FIG. 1F, the camera GUI 180 includes a natural light affordance 188 for selecting a natural lighting effect, a studio light affordance 190 for selecting a studio lighting effect, a contour light affordance 192 for selecting a contour lighting effect, and a stage light affordance 194 for selecting a stage lighting affordance. In some implementations, the camera GUI 180 includes a magnification affordance 196 for selecting a zoom level. In some implementations, the camera GUI 180 includes a flash affordance 198 for turning a flash on or off.

In some implementations, the plot template 130 or the conditional trigger 132 that has been satisfied is associated with a camera setting 134. In such implementations, the content generation engine 200 automatically configures a camera of the electronic device 20 based on the camera setting 134. For example, in some implementations, the content generation engine 200 automatically selects affordances in the camera GUI 180 based on the camera setting 134. As an example, the camera setting 134 may specify the need for a portrait photo captured with the natural lighting effect with a magnification of 2× and the flash being turned on. In this example, the content generation engine 200 automatically selects the media type affordance 186 corresponding to a portrait (e.g., as indicated by the word 'Portrait' being displayed with a bold font). Additionally, in the example of FIG. 1F, the content generation engine 200 selects the natural light affordance 188. Moreover, in the example of FIG. 1F, the content generation engine 200 selects a magnification of 2× (e.g., as indicated by the letters '2×' being displayed within the magnification affordance 196. Furthermore, in the example of FIG. 1F, the content generation engine 200 turns the flash on (e.g., as indicated by the lightning bolt displayed within the flash affordance 198). Since the content generation engine 200 automatically selects the appropriate affordances in the camera GUI 180 based on the camera setting 134, the user 30 does not have to manually select the affordances in the camera GUI 180 (e.g., the user 30 does not have to manually select the media type affordance 186 corresponding to a portrait, the natural light affordance 188, set the magnification level to 2× and turn the flash on).

Figure 1G:
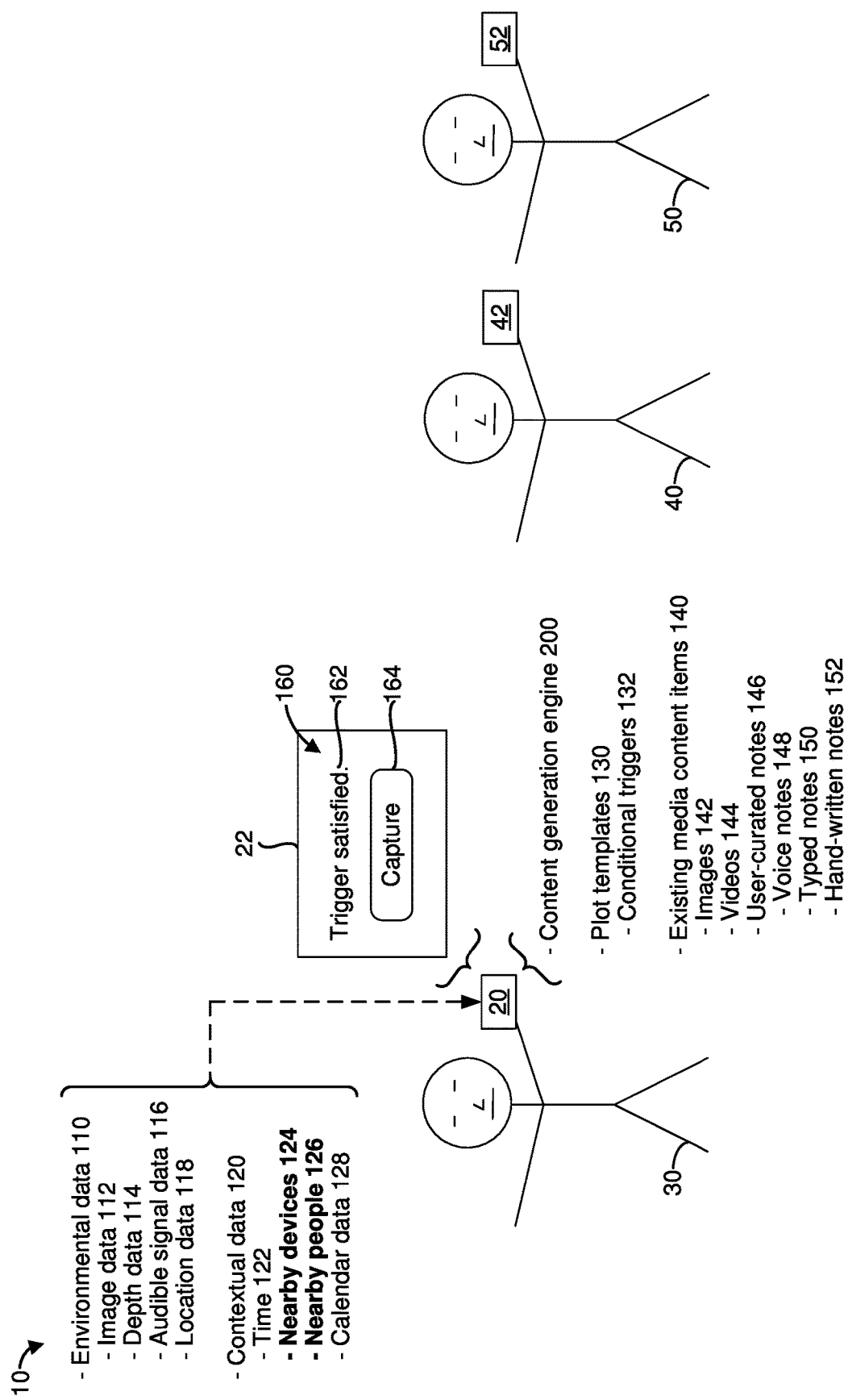

FIG. 1G illustrates that, in some implementations, a conditional trigger 132 is satisfied based on the nearby devices 124 and/or the nearby people 126. In the example of FIG. 1G, the operating environment 10 includes a second person 40 that is using a second device 42 and a third person 50 that is using a third device 52. In some implementations, a conditional trigger 132 specifies to capture an image when the second person 40 and the third person 50 are near the user 30. As such, the electronic device 20 displays the notification 160 in response to detecting that the second person 40 and the third person 50 are within a threshold distance of the user 30. In some implementations, the electronic device 20 detects the second person 40 and the third person 50 based on facial recognition. In some implementations, the electronic device 20 detects the second person 40 and the third person 50 based on beacons transmitted by the second device 42 and the third device 52, respectively.

Figure 1H:
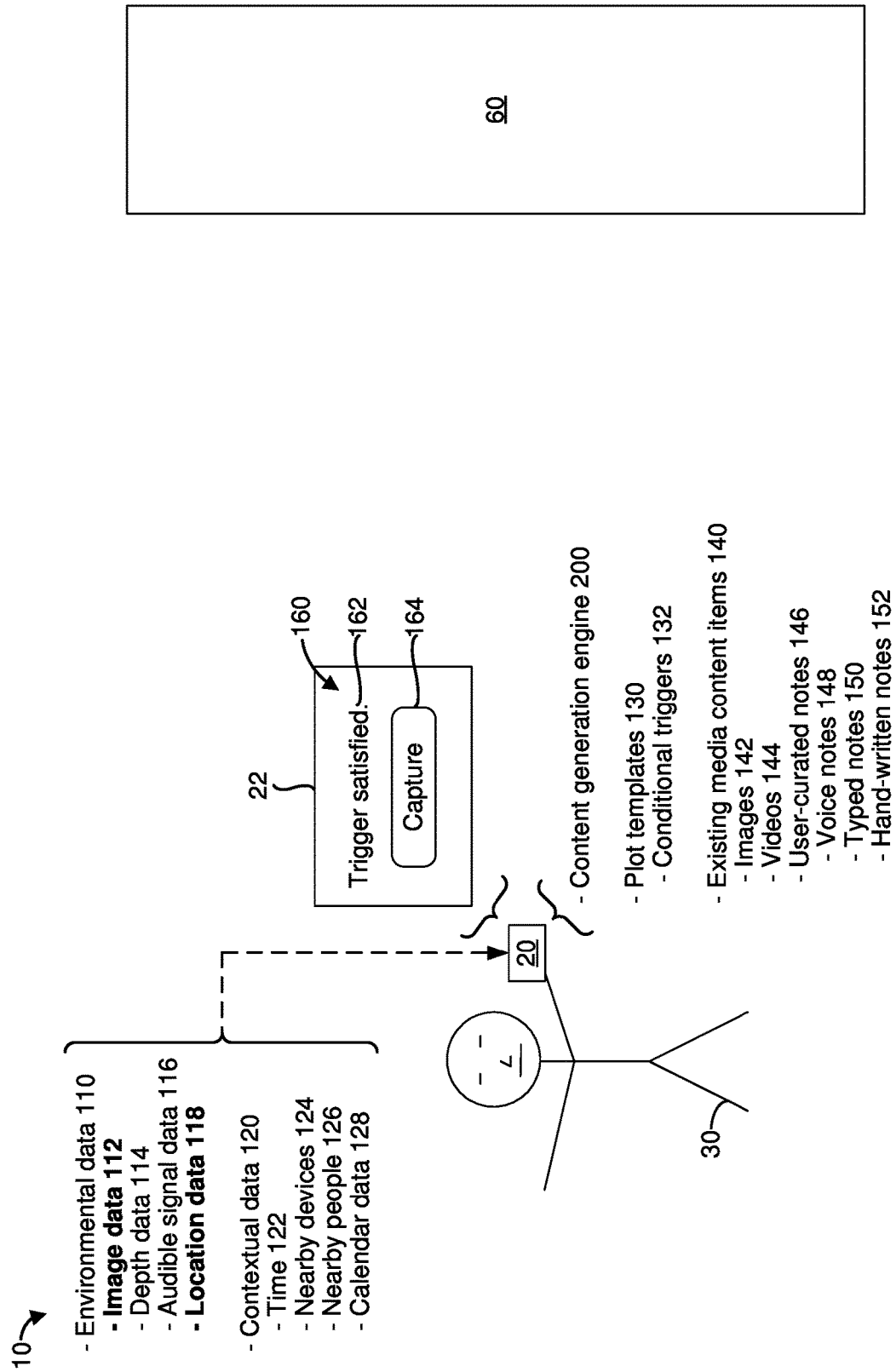

Referring to FIG. 1H, in some implementations, the operating environment 10 includes an object 60. In some implementations, the object 60 includes a landmark (e.g., a natural landmark such as the Niagara Falls) or a monument (e.g., the Eiffel Tower). In some implementations, a conditional trigger 132 specifies that the electronic device 20 capture a photo of the user 30 with the object 60. As such, in the example of FIG. 1H, the content generation engine 200 displays the notification 160 in response to detecting that the electronic device 20 is within a threshold distance of the object 60. In some implementations, the threshold distance is a function of capabilities of a camera of the electronic device 20 (e.g., the threshold distance is a function of a zoom level of the camera). In some implementations, the electronic device 20 detects that the object 60 is within the threshold distance based on the location data 118. For example, the electronic device 20 detects that the object 60 is within the threshold distance when a location of the electronic device 20 indicated by the location data 118 is within the threshold distance of a known location of the object 60.

In some implementations, the electronic device 20 includes an HMD that is worn by the user 30. In some implementations, the HMD presents (e.g., displays) the notification 160 shown in FIG. 1B, the media captured notification 168 shown in FIG. 1D, the media captured notification 170 shown in FIG. 1E, and/or the camera GUI 180 shown in FIG. 1F. In some implementations, the HMD includes an integrated display (e.g., a built-in display, for example, a built-in optical see-through display or a built-in opaque display) that displays notifications. In some implementations, the HMD includes a head-mountable enclosure. In various implementations, the head-mountable enclosure includes an attachment region to which another device with a display can be attached. For example, in some implementations, an electronic watch, a smartphone or a tablet can be attached to the head-mountable enclosure. In various implementations, the head-mountable enclosure is shaped to form a receptacle for receiving another device that includes a display (e.g., an electronic watch, a smartphone or a tablet). For example, in some implementations, a device with a display slides/snaps into or otherwise attaches to the head-mountable enclosure. In some implementations, the display of the device attached to the head-mountable enclosure presents (e.g., displays) the notifications. In various implementations, examples of the electronic device 20 include smartphones, tablets, media players, laptops, etc.

Figure 2:
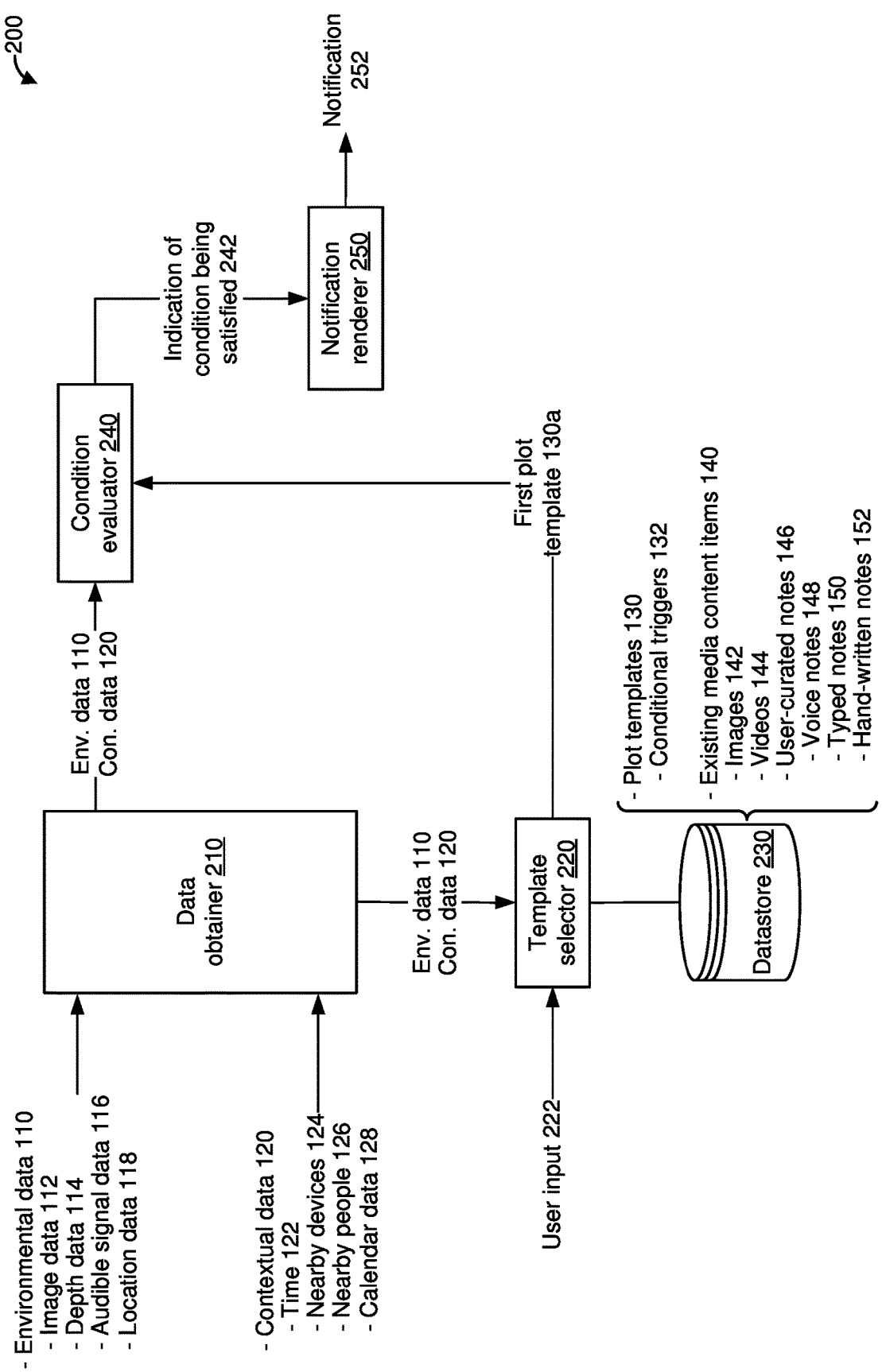
FIG. 2 is a block diagram of a system for capturing content in accordance with some implementations.

FIG. 2 is a block diagram of the content generation engine 200 in accordance with some implementations. In some implementations, the content generation engine 200 resides at (e.g., is implemented by) the electronic device 20 shown in FIGS. 1A-1H. In some implementations, the electronic device 20 (shown in FIGS. 1A-1H) includes the content generation engine 200. In various implementations, the content generation engine 200 includes a data obtainer 210, a template selector 220, a datastore 230 for storing the plot templates 130 and the existing media content items 140, a condition evaluator 240 and a notification renderer 250.

In various implementations, the data obtainer 210 obtains the environmental data 110 and the contextual data 120. In some implementations, the data obtainer 210 obtains the environmental data 110 from an environmental sensor. For example, in some implementations, the data obtainer 210 receives the image data 112 from an image sensor (e.g., a camera). In some implementations, the data obtainer 210 receives the depth data 114 from a depth sensor (e.g., a depth camera). In some implementations, the data obtainer 210 receives the audible signal data 116 from an audio sensor (e.g., a microphone). In some implementations, the audio sensor receives an audible signal that is converted into the audible signal data 116. In some implementations, the data obtainer 210 receives the location data 118 from a location sensor (e.g., a Global Positioning System (GPS)).

In some implementations, the data obtainer 210 determines the contextual data 120 based on the environmental data 110. For example, in some implementations, the data obtainer 210 determines the nearby people 126 by performing facial recognition on the image data 112. In some implementations, the data obtainer 210 receives the contextual data 120 from an application that is installed on the electronic device 20. For example, in some implementations, the data obtainer 210 receives the calendar data 128 from a calendar application that is installed on the electronic device 20. In some implementations, the calendar data 128 indicates an ongoing event or upcoming events. In some implementations, the data obtainer 210 determines the contextual data 120 based on sensor data. For example, in some implementations, the data obtainer 210 determines the nearby devices 124 based on beacons detected by a short-range communication receiver. In some implementations, the data obtainer 210 receives the time 122 from a clock. In various implementations, the data obtainer 210 provides the environmental data 110 and the contextual data 120 to the template selector 220 and the condition evaluator 240.

In various implementations, the template selector 220 selects a first plot template 130a from the plot templates 130 based on the environmental data 110, the contextual data 120 or a user input 222. In some implementations, the environmental data 110 indicates a type of environment that the user 30 is located in, and the template selector 220 selects a plot template 130 that is suitable for the type of environment indicated by the environmental data 110. For example, if the environmental data 110 indicates that the user 30 is at a concert venue, the template selector 220 selects a plot template 130 that corresponds to attending a concert. As another example, if the environmental data 110 indicates that the user 30 is attending a wedding, the template selector 220 selects a plot template 130 that corresponds to attending a wedding.

In some implementations, the template selector 220 selects a plot template 130 based on the contextual data 120. For example, if the nearby people 126 includes colleagues, the template selector 220 selects a plot template 130 that corresponds to a collegial environment. As another example, if the nearby people 126 includes family members, the template selector 220 selects a plot template 130 that corresponds to a familial environment. In some implementations, the calendar data 128 indicates a current event or an upcoming event, and the template selector 220 selects a plot template 130 based on the current event or the upcoming event. For example, if the calendar data 128 indicates that the user 30 is currently undergoing orientation at a college, the template selector 220 selects a plot template 130 that corresponds to a college orientation.

In some implementations, the user input 222 specifies a particular one of the plot templates 130, and the template selector 220 selects the particular plot template 130 indicated by the user input 222. For example, in some implementations, the user 30 selects one of the plot templates 130. In various implementations, the template selector 220 provides the selected plot template 130 (e.g., the first plot template 130a) to the condition evaluator 240.

In various implementations, the first plot template 130a is associated with one or more conditional triggers 132, and the condition evaluator 240 determines whether at least one of the conditional triggers 132 is satisfied. In some implementations, the condition evaluator 240 determines whether the environmental data 110 or the contextual data 120 satisfy one of the conditional triggers 132.

In some implementations, a conditional trigger 132 is associated with a temporal condition. For example, the conditional trigger 132 is satisfied at a particular time. In such implementations, the condition evaluator 240 determines whether the time 122 satisfies the temporal condition. For example, the condition evaluator 240 determines whether the time 122 matches the particular time associated with the conditional trigger 132. As an example, a conditional trigger 132 associated with the first plot template 130a may require the user 30 to capture a picture every 24 hours. In this example, the condition evaluator 240 determines whether 24 hours have passed by since the user 30 last captured a picture. If 24 hours have passed by since the user 30 last captured a picture, the condition evaluator 240 determines that the conditional trigger 132 has been satisfied and the condition evaluator 240 provides an indication 242 of the conditional trigger 132 being satisfied to the notification renderer 250.

In some implementations, a conditional trigger 132 is associated with a spatial condition. For example, the conditional trigger 132 is satisfied at a particular location. In such implementations, the condition evaluator 240 determines whether a current location of the electronic device 20 indicated by the location data 118 satisfies the spatial condition. For example, the condition evaluator 240 determines whether the current location of the electronic device 20 indicated by the location data 118 matches the particular location associated with the conditional trigger 132. As an example, a conditional trigger 132 associated with the first plot template 130a may require the user 30 to capture a picture when the user 30 is at a particular landmark (e.g., a monument such as the Eiffel Tower). In this example, the condition evaluator 240 determines whether a current location of the electronic device 20 is the same as a known location of the particular landmark. If the current location of the electronic device 20 matches the known location of the particular landmark, the condition evaluator 240 determines that the conditional trigger 132 has been satisfied and the condition evaluator 240 provides the indication 242 of the conditional trigger 132 being satisfied to the notification renderer 250.

In some implementations, a conditional trigger 132 is associated with specific people. For example, the conditional trigger 132 is satisfied when the nearby people 126 includes the specific people associated with the conditional trigger 132. In such implementations, the condition evaluator 240 determines whether the nearby people 126 includes the specific people specified by the conditional trigger 132. If the nearby people 126 includes the specific people specified by the conditional trigger 132, the condition evaluator 240 determines that the conditional trigger 132 is satisfied and the condition evaluator 240 provides the indication 242 of the conditional trigger 132 being satisfied to the notification renderer 250. As an example, a conditional trigger 132 associated with the first plot template 130a may require the user 30 to capture a family photo when the user 30 is with his/her siblings and parents. In this example, the condition evaluator 240 determines whether the nearby people 126 includes the siblings and the parents of the user 30. If the nearby people 126 includes the siblings and the parents of the user 30, the condition evaluator 240 determines that the conditional trigger 132 has been satisfied and the condition evaluator 240 provides the indication 242 of the conditional trigger 132 being satisfied to the notification renderer 250.

In some implementations, a conditional trigger 132 is associated with a particular event type. For example, the conditional trigger 132 is satisfied when the user 30 is attending or about to attend an event of the particular event type. In some implementations, the calendar data 128 indicates an event type of a current event that the user 30 is attending or an upcoming event that the user 30 is likely to attend. In such implementations, the condition evaluator 240 determines whether an event type of the current event or the upcoming event matches the particular event type associated with the condition trigger 132. If the event type of the current event or the upcoming event is the same as the particular event type associated with the conditional trigger 132, the condition evaluator 240 determines that the conditional trigger 132 is satisfied and the condition evaluator 240 provides the indication 242 of the conditional trigger 132 being satisfied to the notification renderer 250. As an example, a conditional trigger 132 associated with the first plot template 130a may require the user 30 to capture videos or images when the user is attending a graduation event. In this example, the condition evaluator 240 determines whether the calendar data 128 indicates that the user 30 is attending a graduation event. If the calendar data 128 indicates that the user 30 is attending a graduation event, the condition evaluator 240 determines that the conditional trigger 132 has been satisfied and the condition evaluator 240 provides the indication 242 of the conditional trigger 132 being satisfied to the notification renderer 250.

In various implementations, the notification renderer 250 renders a notification 252 in response to obtaining the indication 242 of a conditional trigger 132 being satisfied. For example, the notification renderer 250 displays the notification 160 shown in FIG. 1B, the media captured notification 168 shown in FIG. 1D, the media captured notification 170 shown in FIG. 1E, and/or the camera GUI 180 shown in FIG. 1F. In some implementations, the notification 252 provides a brief description of the conditional trigger 132 that has been satisfied. For example, the notification 252 includes the text 162 shown in FIG. 1B or the text 172 shown in FIG. 1E. In some implementations, the notification 252 includes an affordance for capturing a new media content item (e.g., a new image, a new video, or a new sound recording). For example, the notification 252 includes the affordance 164 shown in FIG. 1B or the capture affordance 184 shown in FIG. 1F.

In some implementations, the condition evaluator 240 automatically captures a new media content item in response to determining that a conditional trigger 132 has been satisfied. In such implementations, the notification 252 indicates that the content generation engine 200 has automatically captured a new media content item. For example, the notification 252 includes the media captured notification 170 shown in FIG. 1E. In some implementations, the notification 252 provides the user 30 with an option to save the automatically-captured new media content item (e.g., by displaying the save affordance 176 shown in FIG. 1E), and an option to discard the automatically-captured new media content item (e.g., by displaying the delete affordance 178 shown in FIG. 1E).

As described herein, the datastore 230 stores various plot templates 130. However, in various implementations, the content generation engine 200 populates a subset of the plot templates 130 and not all the plot templates 130 at a given time. In the example of FIG. 2, the content generation engine 200 is populating the first plot template 130a and not populating the remainder of the plot templates 130. As such, the notification renderer 250 displays the notification 252 when conditional triggers 132 associated with the first plot template 130a are satisfied. However, the notification renderer 250 forgoes displaying the notification 252 when conditional triggers 132 associated with the remainder of the plot templates 130 are satisfied. More generally, in various implementations, the notification renderer 250 displays the notification 252 when a conditional trigger 132 associated with a plot template 130 that the content generation engine 200 is currently populating is satisfied, and the notification renderer 250 forgoes displaying the notification 252 when a conditional trigger 132 associated with a plot template 130 that the content generation engine 200 is currently not populating is satisfied. As an example, if the content generation engine 200 is populating a graduation plot template, the notification renderer 250 renders the notification 252 when a conditional trigger 132 associated with the graduation plot template is satisfied. In this example, the content generation engine 200 may not render the notification 252 when a conditional trigger 132 associated with a birthday plot template is satisfied, for example, because the content generation engine 200 is not populating the birthday plot template.

Figure 3:
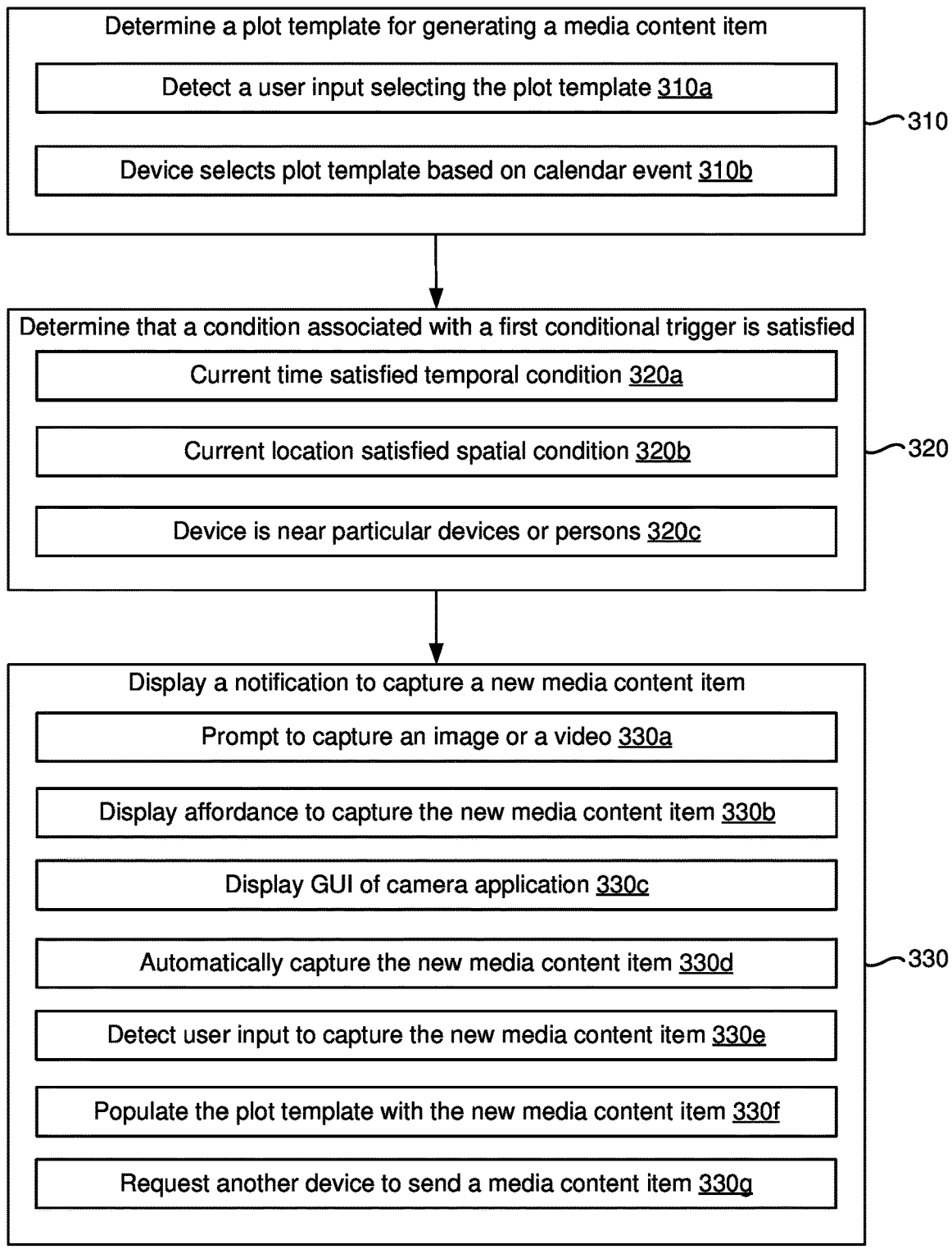
FIG. 3 is a flowchart representation of a method of capturing content in accordance with some implementations.

FIG. 3 is a flowchart representation of a method 300 of capturing a new media content item in accordance with various implementations. In various implementations, the method 300 is performed by a device with a display, one or more processors and a non-transitory memory (e.g., the electronic device 20 shown in FIGS. 1A-1H, and/or the content generation engine 200 shown in FIGS. 1A-2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes determining a plot template for generating a media content item based on other media content items that are distributed temporally. For example, as shown in FIG. 2, the content generation engine 200 (e.g., the template selector 220) selects the first plot template 130a from the plot templates 130. In some implementations, the plot template is defined by a set of one or more conditional triggers for capturing the other media content items. For example, as shown in FIGS. 1A-2, the plot templates 130 are associated with respective conditional triggers 132. In some implementations, determining the plot template includes selecting the plot template from a set of plot templates. For example, as described in relation to FIG. 2, the template selector 220 selects the first plot template 130a from the plot templates 130.

In some implementations, the plot template generates the media content item by using other media content items that were captured over a period of time. In some implementations, the plot template specifies the period of time. For example, in some implementations, if the plot template corresponds to an event (e.g., a wedding event, a graduation event, an orientation event, etc.), the plot template uses media content items that were captured during the event.

In some implementations, the plot template generates a video based on the other media content items. In some implementations, the plot template generates a collage of pictures based on the other media content items. In some implementations, the plot template generates a three-dimensional (3D) virtual environment based on the other media content items. In some implementations, the other media content items include images, videos and user-curated notes. For example, the other media content items include the existing media content items 140 shown in FIGS. 1A-2.

As represented by block 310a, in some implementations, determining the plot template includes receiving a user input selecting the plot template from a plurality of plot templates. For example, as shown in FIG. 2, in some implementations, the template selector 220 receives the user input 222, and the template selector 220 selects the first plot template 130a based on the user input 222. As described in relation to FIG. 2, in some implementations, the user input 222 specifies the first plot template 130a.

As represented by block 310b, in some implementations, determining the plot template includes selecting the plot template based on a calendar event. In some implementations, the method 300 includes selecting a plot template that is suitable for a current event that a user of the device is currently attending or an upcoming event that the user of the device is likely to attend. As an example, if the calendar event specifies 'orientation week', the device selects an orientation week template that the device populates with media content items captured during orientation week. Alternatively or additionally, in this example, the device selects a college experience template that the device populates with media content items captured while the user of the device is in college (e.g., during a four-year period starting at the calendar event corresponding to 'orientation week').

In some implementations, the method 300 includes automatically determining the plot template. For example, as discussed in relation to FIG. 2, in some implementations, the template selector 220 selects the first plot template 130a without the user input 222. In some implementations, the method 300 includes determining the plot template based on existing media content items. For example, in some implementations, the template selector 220 shown in FIG. 2 selects the first plot template 130a based on the existing media content items 140. In some implementations, the method 300 includes selecting a plot template that can be populated beyond a threshold amount with the existing media content items. For example, in some implementations, the template selector 220 shown in FIG. 2 selects the first plot template 130a because the content generation engine 200 can populate the first plot template 130a beyond a threshold amount with the existing media content items 140 (e.g., because the content generation engine 200 can populate more than 50% of the first plot template 130a with the existing media content items 140). In various implementations, automatically selecting the plot template reduces the need for a user input corresponding to the user manually selecting the plot template. In some implementations, reducing the need for user input tends to enhance a user experience of the device. In some implementations, reducing unnecessary user inputs improves a battery life of a battery-operated device.

As represented by block 320, in some implementations, the method 300 includes determining that a condition associated with a first conditional trigger of the set of one or more conditional triggers is satisfied. In some implementations, the method 300 includes obtaining environmental data that indicates environmental conditions of a physical environment surrounding the device, and determining that the first conditional trigger is satisfied based on the environmental data. For example, as shown in FIGS. 1A-2, the electronic device 20 (e.g., the content generation engine 200) receives the environmental data 110, and determines that a conditional trigger 132 associated with the first plot template 130a is satisfied based on the environmental data 110. In some implementations, the method 300 includes obtaining contextual data that indicates a context of the device or a user of the device, and determining that the first conditional trigger is satisfied based on the contextual data. For example, as shown in FIGS. 1A-2, the electronic device 20 (e.g., the content generation engine 200) receives the contextual data 120, and determines that a conditional trigger 132 associated with the first plot template 130a is satisfied based on the contextual data 120. In some implementations, the method 300 includes determining that the condition associated with the first conditional trigger is satisfied based on a combination of the environmental data and the contextual data.

As represented by block 320a, in some implementations, the first conditional trigger defines the condition as a temporal condition. In such implementations, determining that the condition is satisfied includes determining that the temporal condition is satisfied based on a current time. For example, as described in relation to FIG. 2, the condition evaluator 240 determines whether a temporal condition associated with the conditional triggers 132 is satisfied based on the time 122. As an example, if a conditional trigger associated with a plot template for an orientation week specifies that a picture be captured once every day during orientation week and 24 hours have passed since the last picture was captured, the conditional trigger has been satisfied. As such, the user does not have to remember or setup reminders to capture pictures or videos at specific times. Reminding the user to snap pictures, record videos or take notes at specific times enhances a user experience of the device by gathering media content items that can be used to synthesize a personal documentary by populating a plot template. A personal documentary that includes pictures, videos or notes regarding specific times is likely to be more engaging than a personal documentary that lacks pictures, videos or notes regarding the specific times.

As represented by block 320b, in some implementations, the first conditional trigger defines the condition as a spatial condition. In such implementations, determining that the condition is satisfied includes determining that the spatial condition is satisfied based on a current location of the device. For example, as described in relation to FIG. 2, the condition evaluator 240 determines whether a spatial condition associated with the conditional triggers 132 is satisfied based on a current location indicated by the location data 118. As an example, if a conditional trigger associated with a plot template for a vacation to Paris specifies that a picture be captured at or near the Eiffel Tower during the user's trip to Paris and the location data indicates that the device is located at the Eiffel Tower, the conditional trigger has been satisfied. As such, the user does not have to remember or setup reminders to capture pictures or videos at specific locations. Reminding the user to snap pictures, record videos or take notes when the user is at specific locations enhances a user experience of the device by gathering media content items that can be used to synthesize a personal documentary by populating a plot template. A personal documentary that includes pictures, videos or notes that relate to specific locations is likely to be more engaging than a personal documentary that lacks pictures, videos or notes that relate to the specific locations.

As represented by block 320c, in some implementations, the first conditional trigger defines the condition as the device being within a threshold distance of another device or a particular person. In such implementations, determining that the condition is satisfied includes determining that the device is within the threshold distance of the other device or the particular person. For example, as described in relation to FIG. 2, the condition evaluator 240 determines whether the nearby devices 124 or the nearby people 126 includes the devices or the people, respectively, specified by the conditional trigger. As an example, if a conditional trigger associated with a plot template for an office gathering specifies that a picture be captured with all of the user's colleagues and the nearby devices include devices of the user's colleagues or the nearby people include the user's colleagues, the conditional trigger has been satisfied. As such, the user does not have to remember or setup reminders to capture pictures or videos with specific people. Reminding the user to snap pictures, record videos or take notes when the user is with specific people enhances a user experience of the device by gathering media content items that can be used to synthesize a personal documentary by populating a plot template. A personal documentary that includes pictures, videos or notes that relate to specific people is likely to be more engaging than a personal documentary that lacks pictures, videos or notes that relate to the specific people.

As represented by block 330, in some implementations, the method 300 includes in response to the condition associated with the first conditional trigger being satisfied, displaying, on the display, a notification to capture a new media content item for populating the plot template. For example, as shown in FIG. 1B, the electronic device 20 displays the notification 160 in response to a conditional trigger 132 being satisfied. In various implementations, displaying the notification to capture the new media content item reduces the need for the user to remember to capture the new media content item thereby enhancing a user experience of the device. In some implementations, displaying the notification to capture the new media content item reduces the need for the user to manually setup a reminder to capture the new media content item. Reducing the need to setup reminders enhances functionality of the device and/or improves operability of the device by reducing power consumption associated with manually setting up reminders.

As represented by block 330a, in some implementations, the notification includes a prompt to capture an image or a video. For example, as shown in FIG. 1F, the electronic device 20 displays the camera GUI 180 that allows the user 30 to capture different types of images and a video.

As represented by block 330b, in some implementations, the notification includes an affordance to capture the new media content item. For example, as shown in FIG. 1B, the notification 160 includes the affordance 164 for capturing the new media content item. In some implementations, automatically displaying the affordance to capture the new media content item reduces the need for the user to provide a sequence of user inputs that correspond to opening a camera application that includes the affordance.

As represented by block 330c, in some implementations, displaying the notification includes displaying a graphical user interface (GUI) of a camera application. For example, as shown in FIG. 1F, the electronic device 20 displays the camera GUI 180. In some implementations, the first conditional trigger specifies a camera setting for capturing the new media content item, and displaying the notification includes setting values for GUI elements in the GUI based on the camera setting specified by the first conditional trigger. For example, as shown in FIG. 1F, the electronic device 20 selects the media type affordance 186 corresponding to a portrait image, the natural light affordance 188, sets the magnification value to 2.0 (e.g., to '2×') and turns the flash on as indicated by the camera setting 134.

As represented by block 330d, in some implementations, displaying the notification includes automatically capturing the new media content item and indicating that the new media content item has been captured. For example, as shown in FIG. 1E, the electronic device 20 displays the media captured notification 170 after automatically capturing a new media content item. In some implementations, displaying the notification includes displaying a first affordance to discard the new media content item that was captured automatically and a second affordance to store the new media content item in order to allow the new media content item to be used for populating the plot template. For example, as shown in FIG. 1E, the media captured notification 170 includes the save affordance 176 for saving the automatically-captured media content item and the delete affordance 178 for deleting the automatically-captured media content item.

As represented by block 330e, in some implementations, the method 300 includes detecting a user input corresponding to capturing the new media content item, and populating at least a portion of the plot template with the new media content item. For example, as shown in FIG. 1C, the electronic device 20 detects the user input 166 directed to the affordance 164. As discussed in related to FIG. 2, the content generation engine 200 populates the first plot template 130a with the newly-captured media content item.

As represented by block 330f, in some implementations, the method 300 includes populating at least a portion of the plot template with existing media content items and the new media content item, and generating the media content item when the plot template has been populated. For example, in some implementations, the electronic device 20 populates the first plot template 130a shown in FIG. 2 with a subset of the existing media content items 140 that satisfy the first plot template 130a and a new media content item that satisfies the first plot template 130a. As an example, if the user is halfway through college and the device receives a request to generate a college experience, the device populates a portion of the college experience template with existing photos and videos. In this example, as the user captures additional photos and videos that the device prompts the user to capture, the device continues populating the remainder of the college experience template with the additional photos and videos that the user is prompted to capture.

As represented by block 330g, in some implementations, the method 300 includes displaying an affordance to request another device to send a media content item that satisfies a second conditional trigger of the set of one or more conditional triggers. As an example, if the device is populating a road trip plot template with images and videos that the user captured during a road trip, the device can provide the user an option to request additional photos or videos from other people that accompanied the user on the road trip. In this example, if the user selects the option to request additional photos or videos from other people that accompanied the user on the road trip, the device sends a request to the other people for pictures and videos from the road trip. If the device receives pictures and videos from other devices in response to sending the request, the device uses at least some of the received pictured and videos to populate the road trip template.

In some implementations, the method 300 includes presenting an audio notification to capture the new media content item. For example, the device may output audio corresponding to "take a picture", "record a video", "write a note", etc. In some implementations, the method 300 includes playing the audio notification instead of or in addition to displaying a visual notification. In some implementations, the method 300 includes presenting a haptic notification to capture the new media content item. In some implementations, the method 300 includes presenting the haptic notification instead of or in addition to displaying a visual notification.

Figure 4:
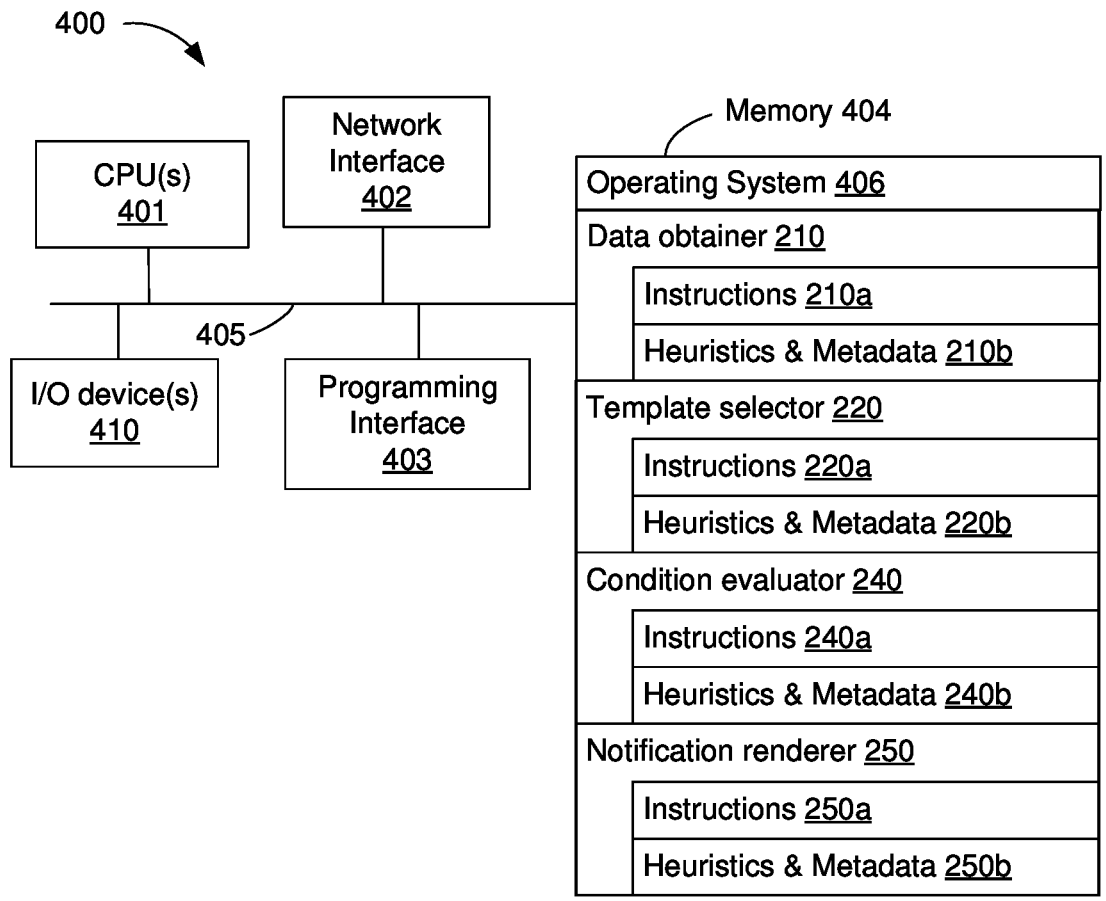
FIG. 4 is a block diagram of a device that captures content in accordance with some implementations.

FIG. 4 is a block diagram of a device 400 that prompts a user of the device 400 to capture new media content items that satisfy a plot template. In some implementations, the device 400 implements the electronic device 20 shown in FIGS. 1A-1H, and/or the content generation engine 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (110) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the template selector 220, the condition evaluator 240 and the notification renderer 250. In various implementations, the device 400 performs the method 300 shown in FIG. 3.

In some implementations, the data obtainer 210 obtains environmental data and contextual data. In some implementations, the data obtainer 210 performs at least some of the operations represented by block 320 in FIG. 3. To that end, the data obtainer 210 includes instructions 210a, and heuristics and metadata 210b.

In some implementations, the template selector 220 selects a plot template. In some implementations, the template selector 220 performs the operation(s) represented by block 310 in FIG. 3. To that end, the template selector 220 includes instructions 220a, and heuristics and metadata 220b.

In some implementations, the condition evaluator 240 determines whether a condition associated with a conditional trigger of the plot template is satisfied. In some implementations, the condition evaluator 240 performs the operation(s) represented by block 320 in FIG. 3. To that end, the condition evaluator 240 includes instructions 240a, and heuristics and metadata 240b.

In some implementations, the notification renderer 250 displays a notification to capture a new media content item when the condition associated with the conditional trigger is satisfied. In some implementations, the notification renderer 250 performs the operation(s) represented by block 330 in FIG. 3. To that end, the notification renderer 250 includes instructions 250a, and heuristics and metadata 250b.

In various implementations, the one or more I/O devices 410 include an environmental sensor for capturing environmental data (e.g., the environmental data 110 shown in FIGS. 1A-2). In some implementations, the one or more I/O devices 410 include an image sensor (e.g., a camera) to capture image data (e.g., for capturing the image data 112 shown in FIGS. 1A-2). In some implementations, the one or more I/O devices 410 include a depth sensor (e.g., a depth camera) to capture depth data (e.g., for capturing the depth data 114 shown in FIGS. 1A-2). In some implementations, the one or more I/O devices 410 include an audio sensor (e.g., a microphone) for receiving an audible signal (e.g., for capturing the audible signal data 116 shown in FIGS. 1A-2). In some implementations, the one or more I/O devices 410 include a display for displaying the notification (e.g., the notification 160 shown in FIG. 1B, the media captured notification 168 shown in FIG. 1D, the media captured notification 170 shown in FIG. 1E or the camera GUI 180 shown in FIG. 1F). In some implementations, the one or more I/O devices 410 include a speaker for outputting an audio notification.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

Users of electronic devices capture various media content items. For example, users of mobile electronic devices with cameras capture numerous images and record numerous videos. Users of electronic devices also capture notes such as voice memos, typed notes and handwritten notes. However, the media content items are disjointed and do not convey a cohesive story.

The present disclosure provides methods, systems, and/or devices for synthesizing a new media content item based on existing media content items by populating a plot template that conveys a cohesive story. The device allows a user to create a personal documentary that has an underlying plot by populating a plot template with existing media content items. Populating the plot template with a subset of existing media content items results in a personal documentary that conveys a cohesive story or a plot. The plot of the personal documentary is a function of the plot template. The device may have access to various plot templates that the device can use to convey different types of plots. The device can select a particular plot template that conveys a plot that matches the existing media content items. Alternatively, the user can select a plot template and the device selects a subset of the existing media content items that match the selected plot template.

Figure 5A:
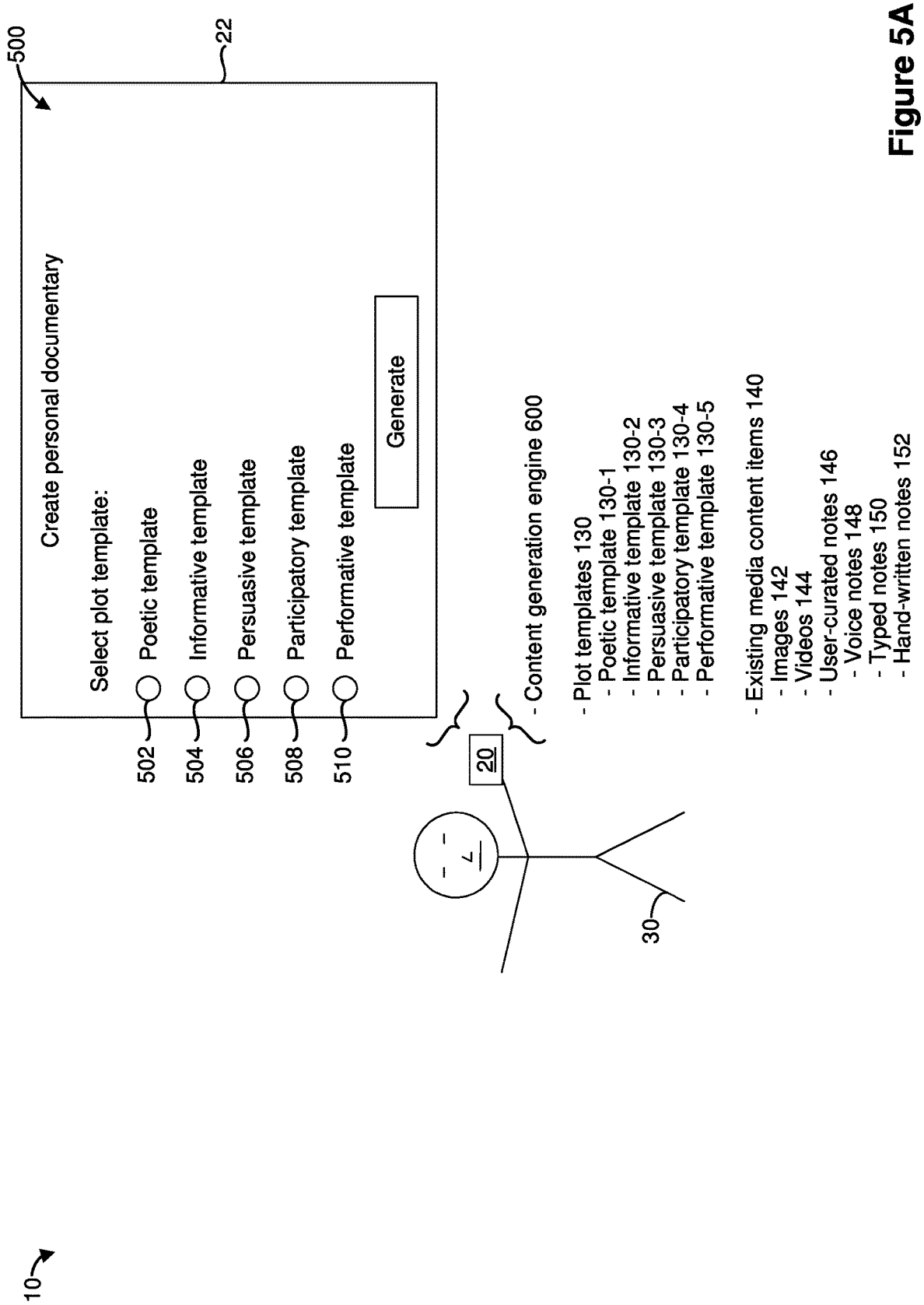
FIGS. 5A-5M are diagrams of an example operating environment for generating content in accordance with some implementations.

Referring to FIG. 5A, in some implementations, the plot templates 130 include a poetic template 130-1 for synthesizing a poetic documentary, an informative template 130-2 for synthesizing an informative documentary, a persuasive template 130-3 for synthesizing a persuasive documentary, a participatory template 130-4 for synthesizing a participatory documentary, and a performatory template 130-5 for synthesizing a performative documentary.

In some implementations, the poetic template 130-1 uses existing media content items 140 that share a common expression. For example, in some implementations, the poetic template 130-1 uses images 142 or videos 144 in which the user 30 has a particular facial expression. In some implementations, the poetic template 130-1 uses user-curated notes 146 that have a particular tone. In some implementations, the poetic template 130-1 is associated with a particular type of expression (e.g., happy, content, etc.), and the poetic template 130-1 uses existing media content items 140 that satisfy the particular type of expression. For example, if the poetic template 130-1 is associated with a happy expression, the poetic template 130-1 uses images 142 or videos 144 in which the facial expression of the user 30 indicates that the user 30 is happy. As another example, if the poetic template 130-1 is associated with a triumphant expression, the poetic template 130-1 uses user-curated notes 146 in which the user 30 used a triumphant tone (e.g., words or phrases that correspond to the triumphant tone).

In some implementations, the informative template 130-2 uses existing media content items 140 that are informative. In some implementations, the informative template 130-2 is associated with an information threshold, and the informative template 130-2 uses existing media content items 140 that satisfy the information threshold. In some implementations, the informative template 130-2 uses existing media content items 140 that provide an amount of information that satisfies (e.g., exceeds) the information threshold. For example, in some implementations, the informative template 130-2 uses existing media content items 140 that indicate a set of numerical values (e.g., a table, a chart, etc.).

In some implementations, the persuasive template 130-3 uses existing media content items 140 that are persuasive. In some implementations, the persuasive template 130-3 is associated with a persuasion threshold, and the persuasive template 130-3 uses existing media content items 140 that satisfy the persuasion threshold. In some implementations, the persuasive template 130-3 uses existing media content items 140 that include persuasive terms. For example, in some implementations, the persuasive template 130-3 is associated with a set of persuasive phrases, and the persuasive template 130-3 uses existing media content items 140 that use phrases from the set of persuasive phrases associated with the persuasive template 130-3.

In some implementations, the participatory template 130-4 uses existing media content items 140 that provide answers to a set of one or more questions. In some implementations, the participatory template 130-4 is associated with a set of questions, and the participatory template 130-4 uses existing media content items 140 that provide answers to the set of questions. For example, in some implementations, the participatory template 130-4 selects existing media content items 140 that provide answers for what happened, when did an event occur, why did the event occur, etc. As an example, the participatory template 130-4 selects an existing media content item 140 that includes a date or a time in order to answer the question of when did an event occur.

In some implementations, the performatory template 130-5 uses existing media content items 140 that relate to a particular subject. In some implementations, the performatory template 130-5 is associated with a subject that satisfies a public awareness threshold. For example, the public at large is concerned regarding or is at least discussing the subject. In some implementations, the performatory template 130-5 uses existing media content items 140 that relate to the subject associated with the performatory template 130-5. As an example, if the subject is climate change, the performatory template 130-5 selects existing media content items 140 that relate to climate change. For example, the performatory template 130-5 may select user-curated notes 146 that relate to climate change, and/or the performatory template 130-5 may select photos or videos in which the user 30 is performing an action that relates to climate change (e.g., insulating his/her home windows in order to reduce energy consumption).

In the example of FIG. 5A, the electronic device 20 displays a graphical user interface (GUI) 500 ("interface 500", hereinafter for the sake of brevity) for generating personal documentaries. In various implementations, the interface 500 allows the user 30 to create a personal documentary that uses a combination of the existing media content items 140. In some implementations, the interface 500 provides the user 30 with an option to select a type of personal documentary by selecting one of the plot templates 130. In the example of FIG. 5A, the interface 500 includes a poetic template affordance 502 for selecting the poetic template 130-1, an informative template affordance 504 for selecting the informative template 130-2, a persuasive template affordance 506 for selecting the persuasive template 130-3, a participatory template affordance 508 for selecting the participatory template 130-4, and a performative template affordance 510 for selecting the performatory template 130-5.

In various implementations, the operating environment 10 includes a content generation engine 600. In some implementations, the electronic device 20 implements the content generation engine 600. For example, the content generation engine 600 is integrated into the electronic device 20. In some implementations, the content generation engine 600 is separate from the electronic device 20. For example, the content generation engine 600 resides at another device (e.g., a server or a cloud computing platform). In some implementations, the content generation engine 600 performs the operations described in relation to the content generation engine 200 described in FIGS. 1A-2. In various implementations, the content generation engine 600 selects a subset of the existing media content items 140 based on the plot template that the user 30 selects.

Figure 5B:
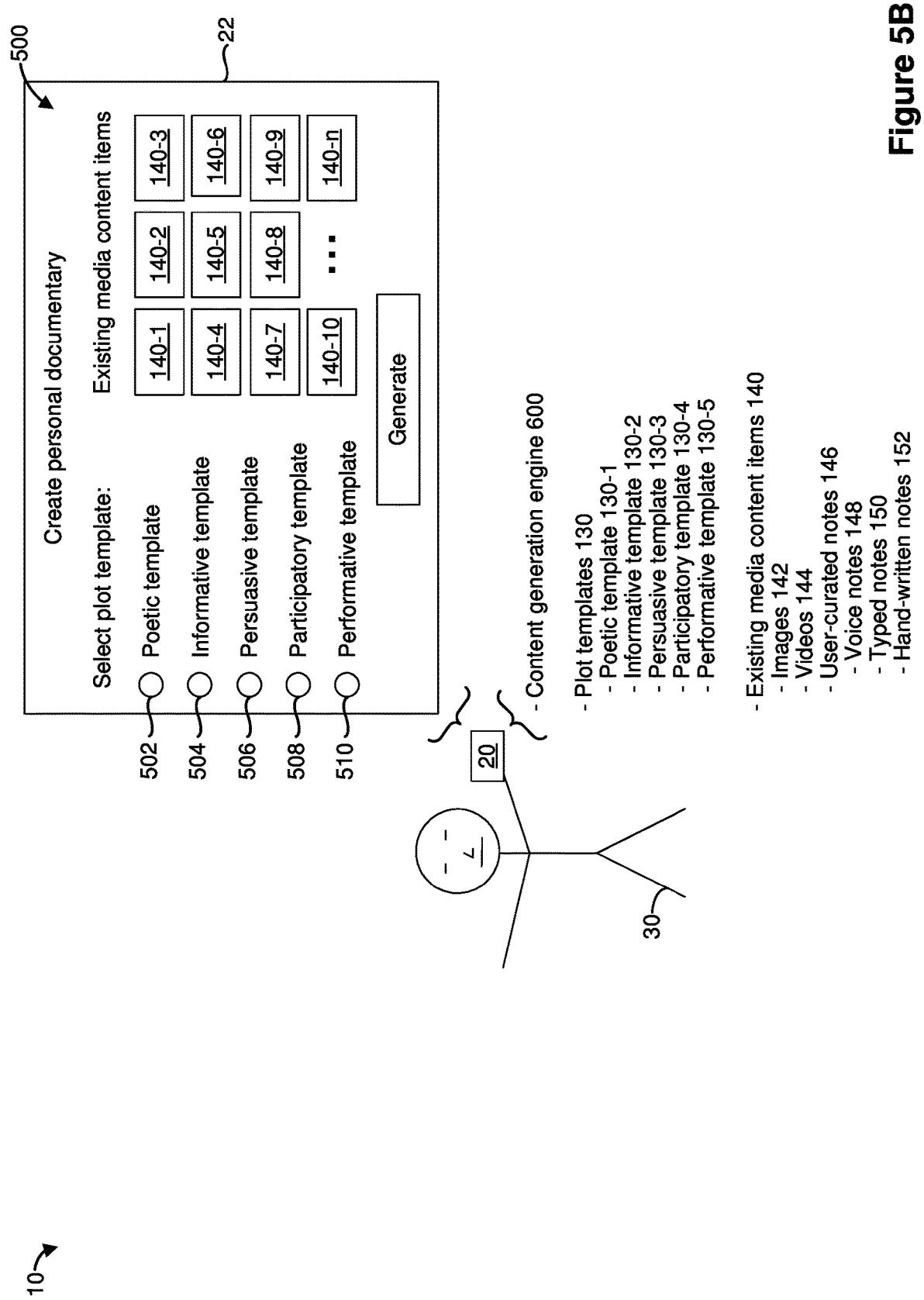

Referring to FIG. 5B, in some implementations, the existing media content items 140 include a first media content item 140-1, a second media content item 140-2, . . . , and an nth media content item 140-n.

Figure 5C:
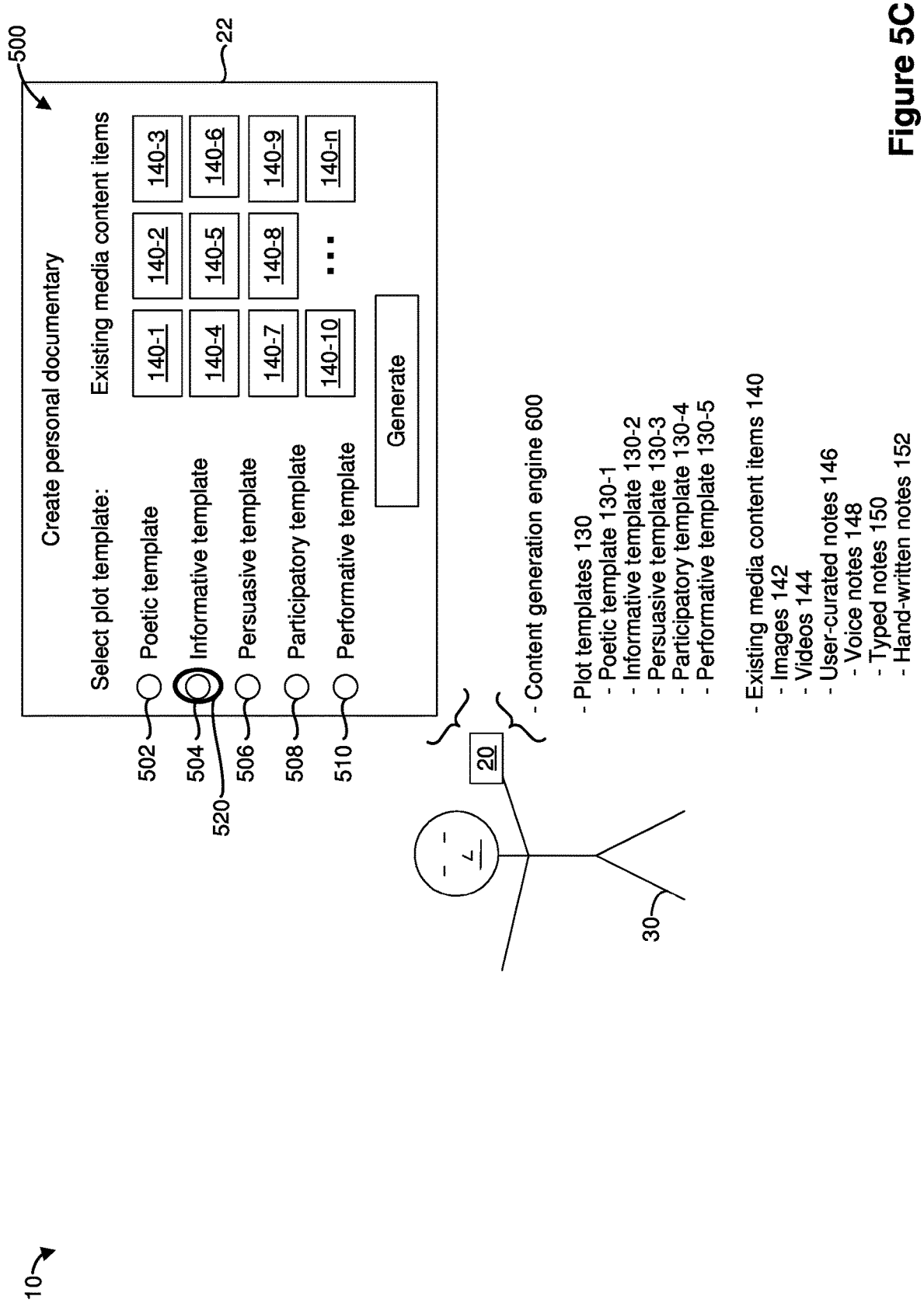

Referring to FIG. 5C, the electronic device 20 detects a user input 520 selecting the informative template affordance 504. For example, the electronic device 20 detects a contact (e.g., a tap) at a location corresponding to the informative template affordance 504.

Figure 5D:
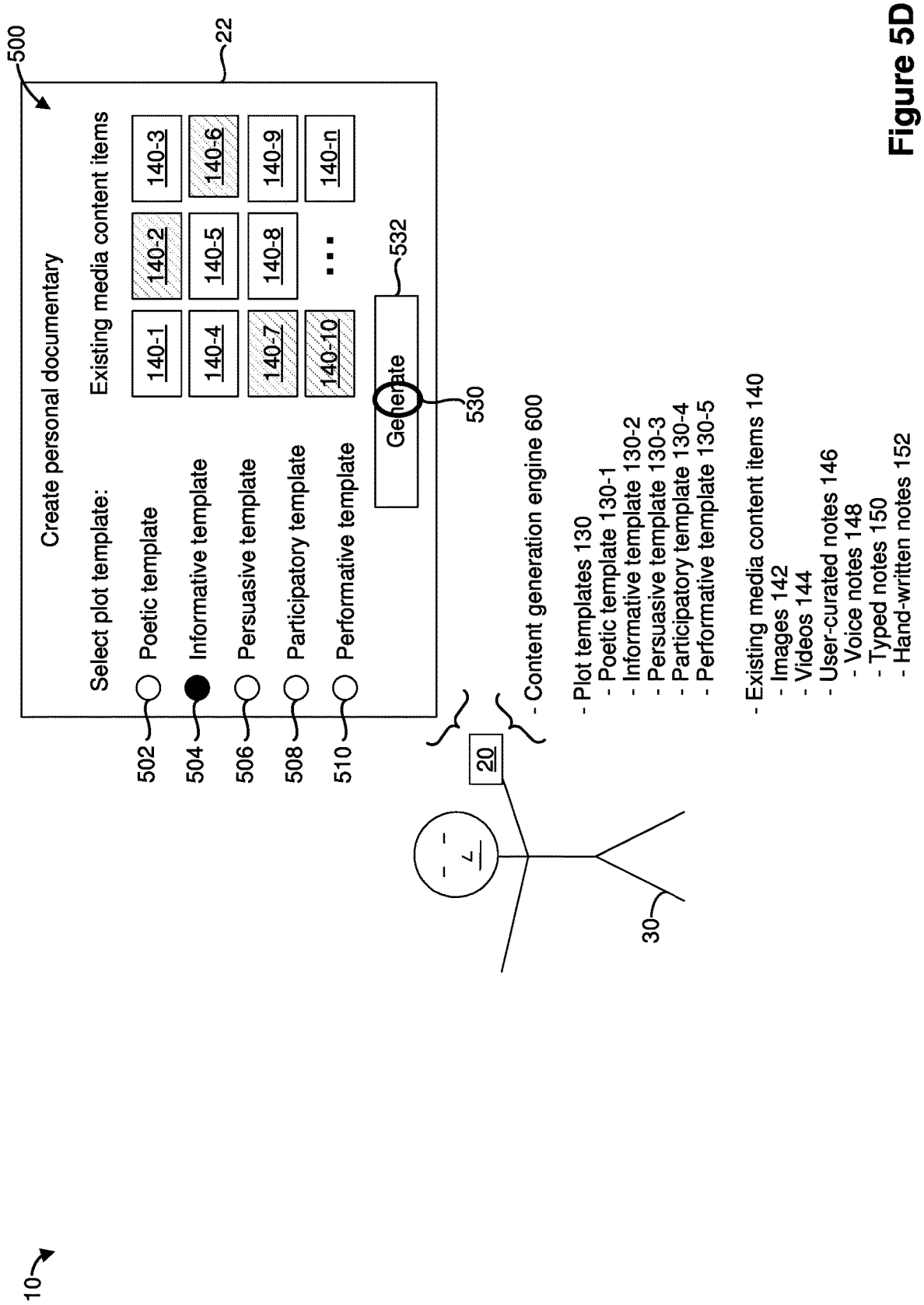

Referring to FIG. 5D, in some implementations, in response to detecting the user input 520 shown in FIG. 5C, the content generation engine 600 selects a subset of the existing media content items 140 in order to populate the informative template 130-2. In the example of FIG. 5D, the content generation engine 600 selects the first media content item 140-1, the third media content item 140-3, the fourth media content item 140-4, the fifth media content item 140-5, the eighth media content item 140-8, the ninth media content item 140-9 and the nth media content item 140-n for populating the informative template 130-2 in order to generate an informative documentary. In some implementations, the selected media content items 140-1, 140-3, 140-4, 140-5, 140-8, 140-9 and 140-n satisfy an information threshold associated with the informative template 130-2. For example, in some implementations, the selected media content items 140-1, 140-3, 140-4, 140-5, 140-8, 140-9 and 140-n include an amount of information that exceeds the information threshold.

In the example of FIG. 5D, the content generation engine 600 forgoes selection of the second media content item 140-2, the sixth media content item 140-6, the seventh media content item 140-7 and the tenth media content item 140-10. As such, the content generation engine 600 does not populate the informative template 130-2 with the media content items 140-2, 140-6, 140-7 and 140-10. In some implementations, the content generation engine 600 forgoes selection of the media content items 140-2, 140-6, 140-7 and 140-10 because the media content items 140-2, 140-6, 140-7 and 140-10 breach an information threshold associated with the informative template 130-2. For example, in some implementations, the media content items 140-2, 140-6, 140-7 and 140-10 do not provide an amount of information that exceeds the information threshold.

As illustrated in FIG. 5D, the electronic device 20 detects a user input 530 directed to a generate affordance 532. In the example of FIG. 5D, the user input 530 corresponds to a request to generate a personal documentary using the informative template 130-2. In some implementations, the user input 530 corresponds to a request to generate an informative documentary by populating the informative template 130-2 with the existing media content items 140-1, 140-3, 140-4, 140-5, 140-8, 140-9 and 140-n.

Figure 5E:
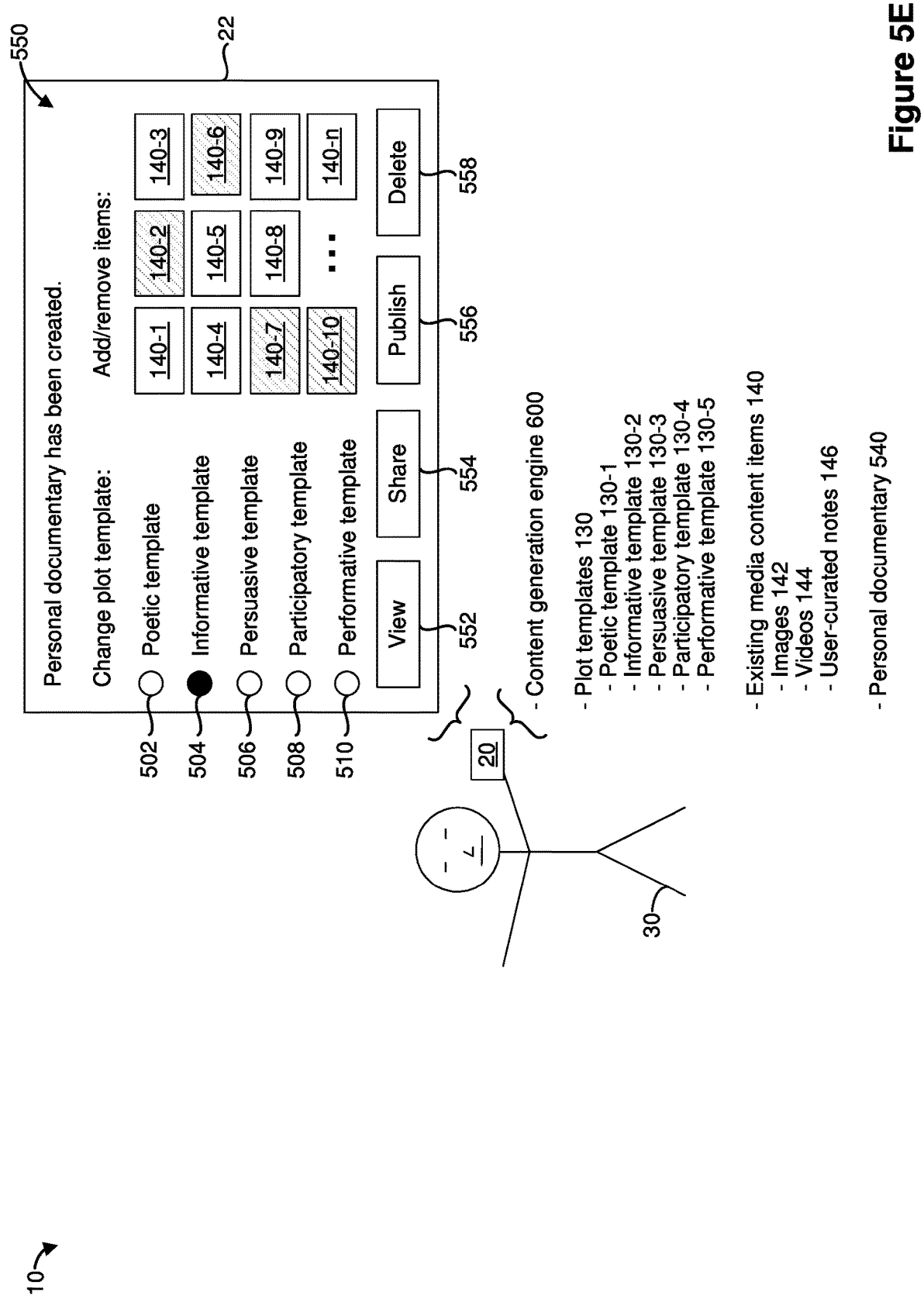

Referring to FIG. 5E, in some implementations, in response to detecting the user input 530 shown in FIG. 5D, the content generation engine 600 generates a personal documentary 540 (e.g., an informative documentary) by populating the informative template 130-2 with the existing media content items 140-1, 140-3, 140-4, 140-5, 140-8, 140-9 and 140-n. In some implementations, the electronic device 20 displays an edit interface 550 that allows the user 30 to edit the personal documentary 540 that the content generation engine 600 generated. For example, in some implementations, the edit interface 550 allows the user 30 to add existing media content items 140 to the personal documentary 540 or remove existing media content items 140 from the personal documentary 540.

In some implementations, the edit interface 550 includes a view affordance 552 for viewing the personal documentary 540. In some implementations, the edit interface 550 includes a share affordance 554 for sharing the personal documentary 540 (e.g., for sending the personal documentary to another device). In some implementations, the edit interface 550 includes a publish affordance 556 for publishing the personal documentary 540 (e.g., for uploading the personal documentary on a video-sharing platform). In some implementations, the edit interface 550 includes a delete affordance 558 for deleting the personal documentary 540.

In some implementations, the edit interface 550 displays the affordances 502, 504, 506, 508 and 510 corresponding to respective type of plot templates in order to allow the user 30 to change the plot template of the personal documentary 540. In some implementations, if the user 30 opts to change the plot template for the personal documentary 540, the content generation engine 600 selects different existing media content items 140 in order to re-generate the personal documentary 540 based on the newly-selected plot template.

Figure 5F:
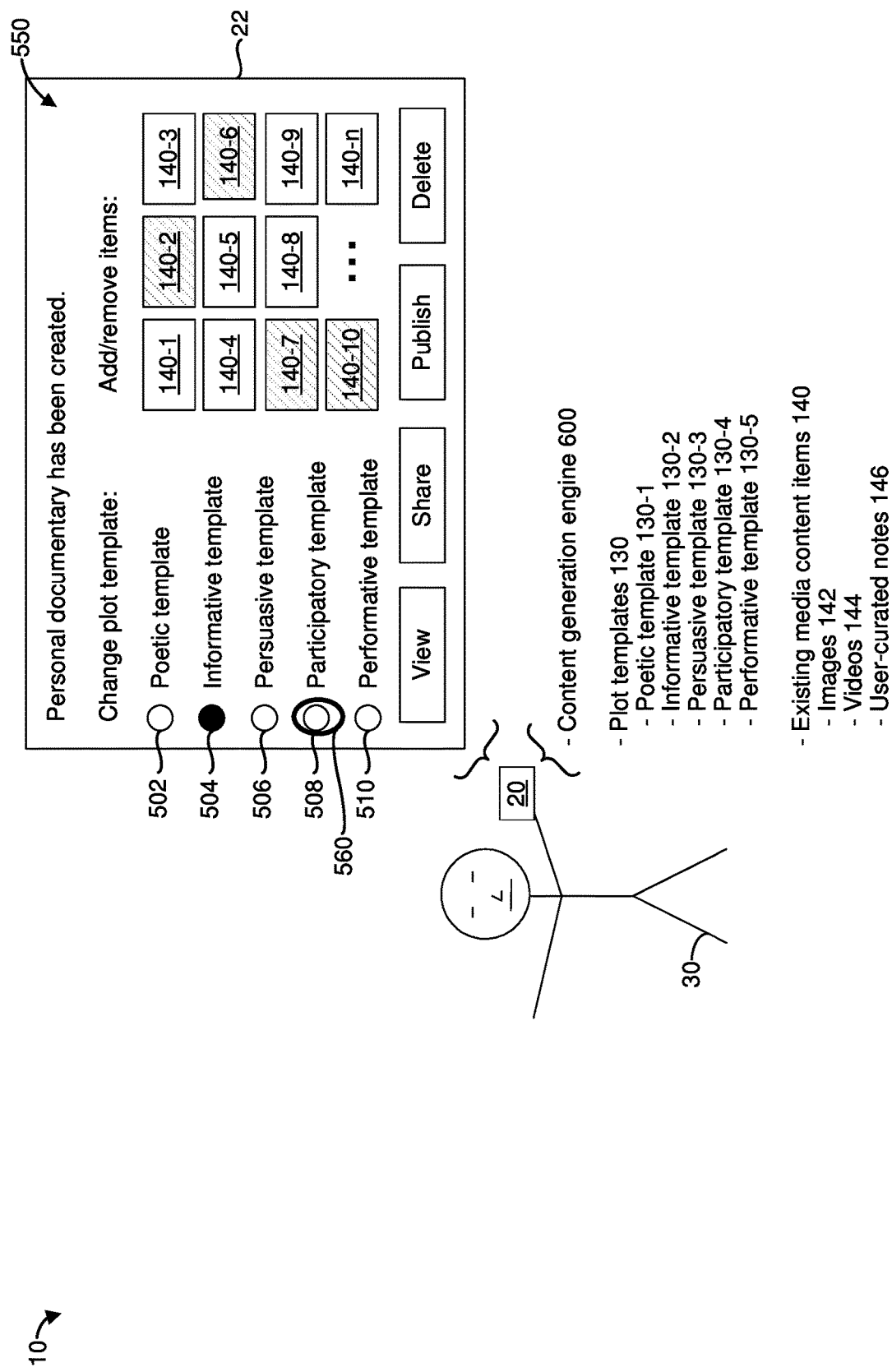

FIG. 5F illustrates a user input 560 directed to the participatory template affordance 508. In some implementations, the user input 560 corresponds to a request to change the plot template of the personal documentary 540 from the informative template 130-2 to the participatory template 130-4.

Figure 5G:
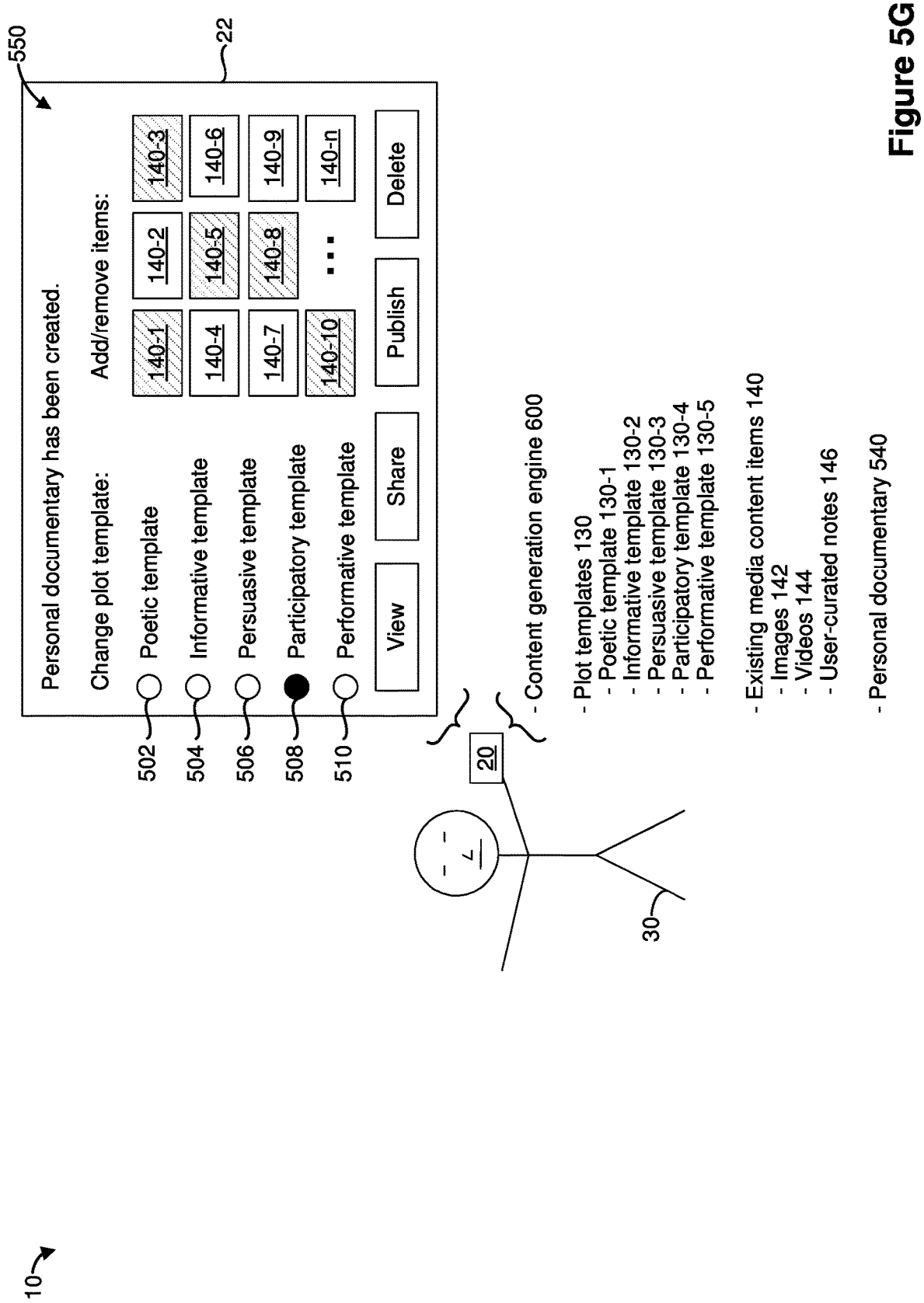

As illustrated in FIG. 5G, in some implementations, in response to detecting the change in the plot template, the content generation engine 600 selects different existing media content items 140 to re-generate the personal documentary 540 based on the participatory template 130-4. In the example of FIG. 5G, the content generation engine 600 selects the second media content item 140-2, the fourth media content item 140-4, the sixth media content item 140-6, the seventh media content item 140-7, the ninth media content item 140-9 and the nth media content item 140-n to populate the participatory template 130-4 in order to generate a participatory documentary. In some implementations, the content generation engine 600 selects the media content items 140-2, 140-4, 140-6, 140-7, 140-9 and 140-n because the media content items 140-2, 140-4, 140-6, 140-7, 140-9 and 140-n provide answers to a set of questions associated with the participatory template 130-4.

As illustrated in the sequence of FIGS. 5F and 5G, in some implementations, the content generation engine 600 selects different existing media content items 140 for different plot templates 130. In some implementations, while some existing media content items 140 may be suitable for one of the plot templates 130, the same existing media content items 140 may not be suitable for another one of the plot templates 130. As an example, while the first media content item 140-1 and the third media content item 140-3 are suitable for the informative template 130-2, the first media content item 140-1 and the third media content item 140-3 are not suitable for the participatory template 130-4. As such, the content generation engine 600 deselects the first media content item 140-1 and the third media content item 140-3 in response to the user 30 switching from the informative template 130-2 to the participatory template 130-4.

Figure 5H:
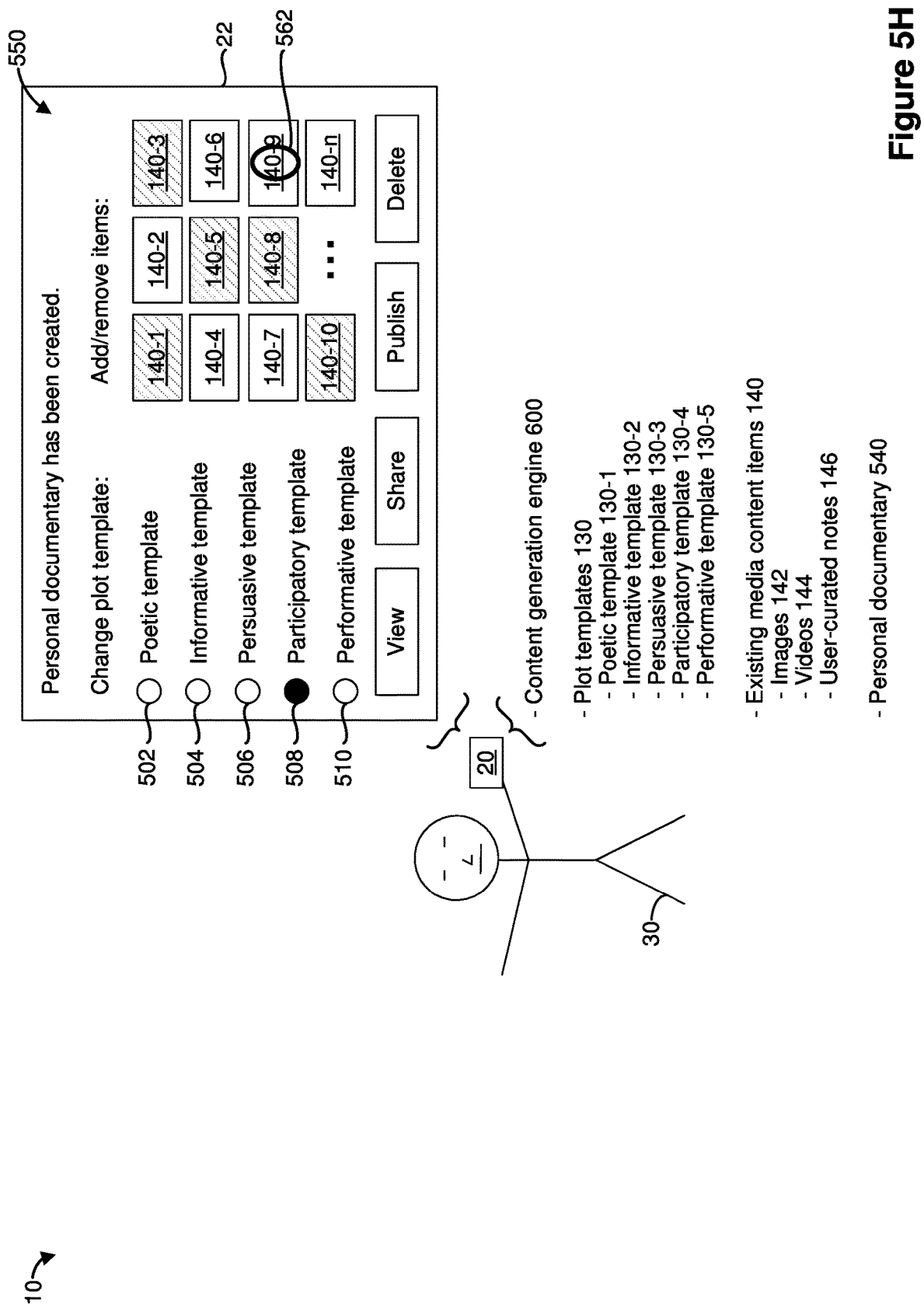
Figure 5I:
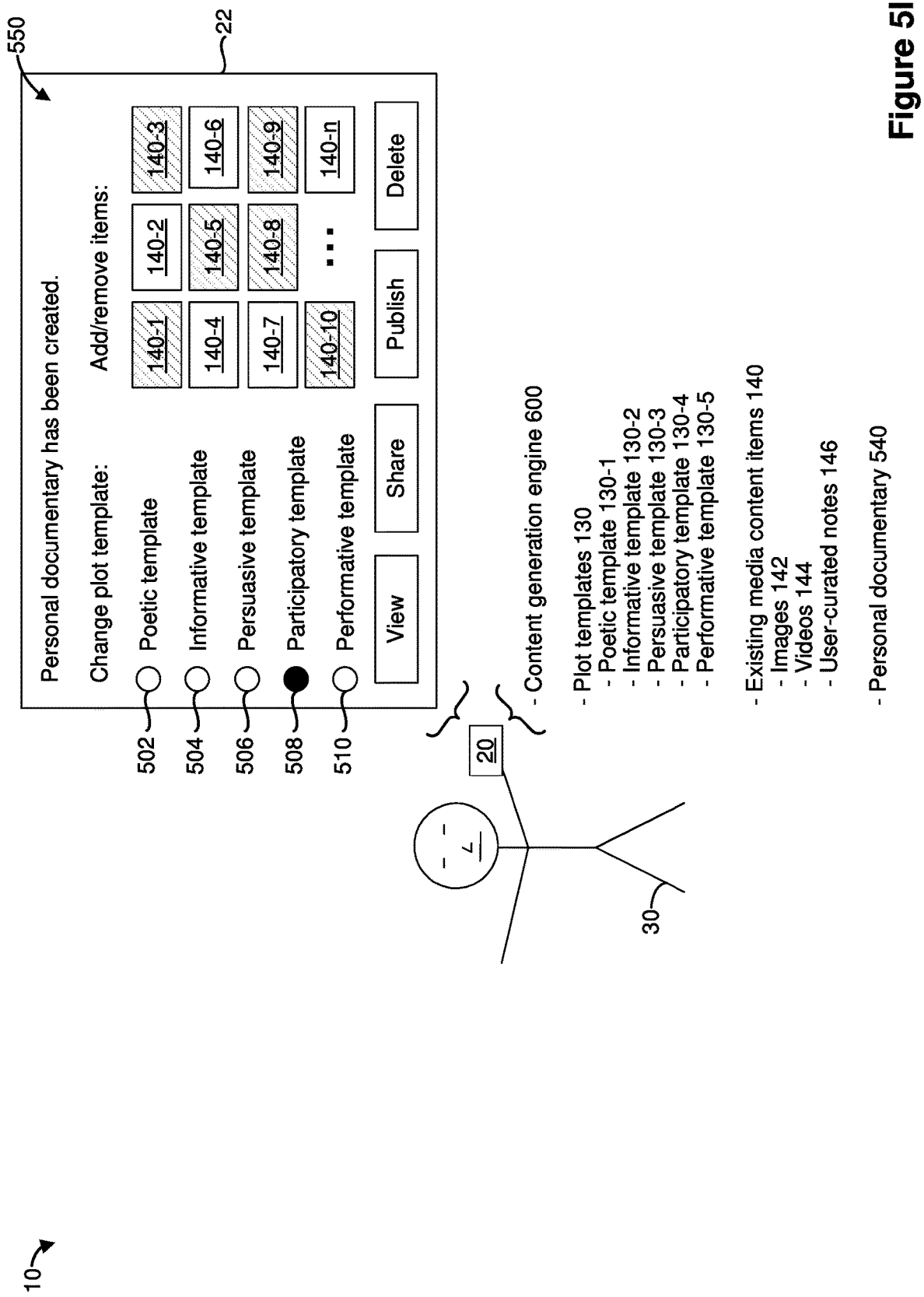

FIGS. 5H and 5I illustrate a sequence in which the electronic device 20 allows the user 30 to modify the personal documentary 540 by removing an existing media content item 140 that the content generation engine 600 used to generate the personal documentary 540. In the example of FIG. 5H, the electronic device 20 detects a user input 562 directed to a representation of the ninth media content item 140-9. The user input 562 corresponds to a request to remove the ninth media content item 140-9 from the personal documentary 540. As shown in FIG. 5I, the content generation engine 600 re-generates the personal documentary 540 such that the ninth media content item 140-9 is not integrated into the personal documentary 540 (e.g., an indicated by the shading of the ninth media content item 140-9). In some implementations, the content generation engine 600 removes the ninth media content item 140-9 from the participatory template 130-4.

Figure 5J:
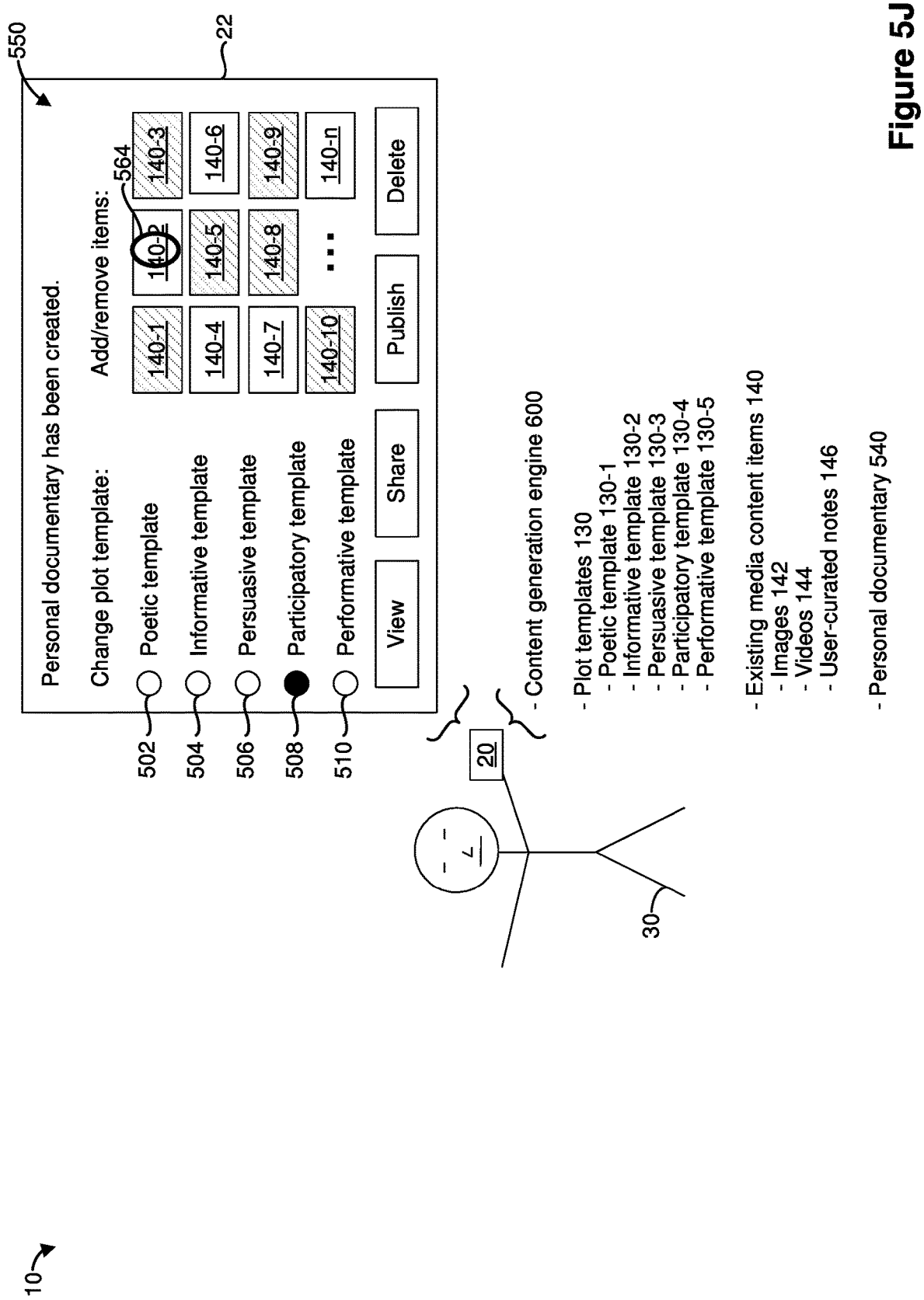
Figure 5K:
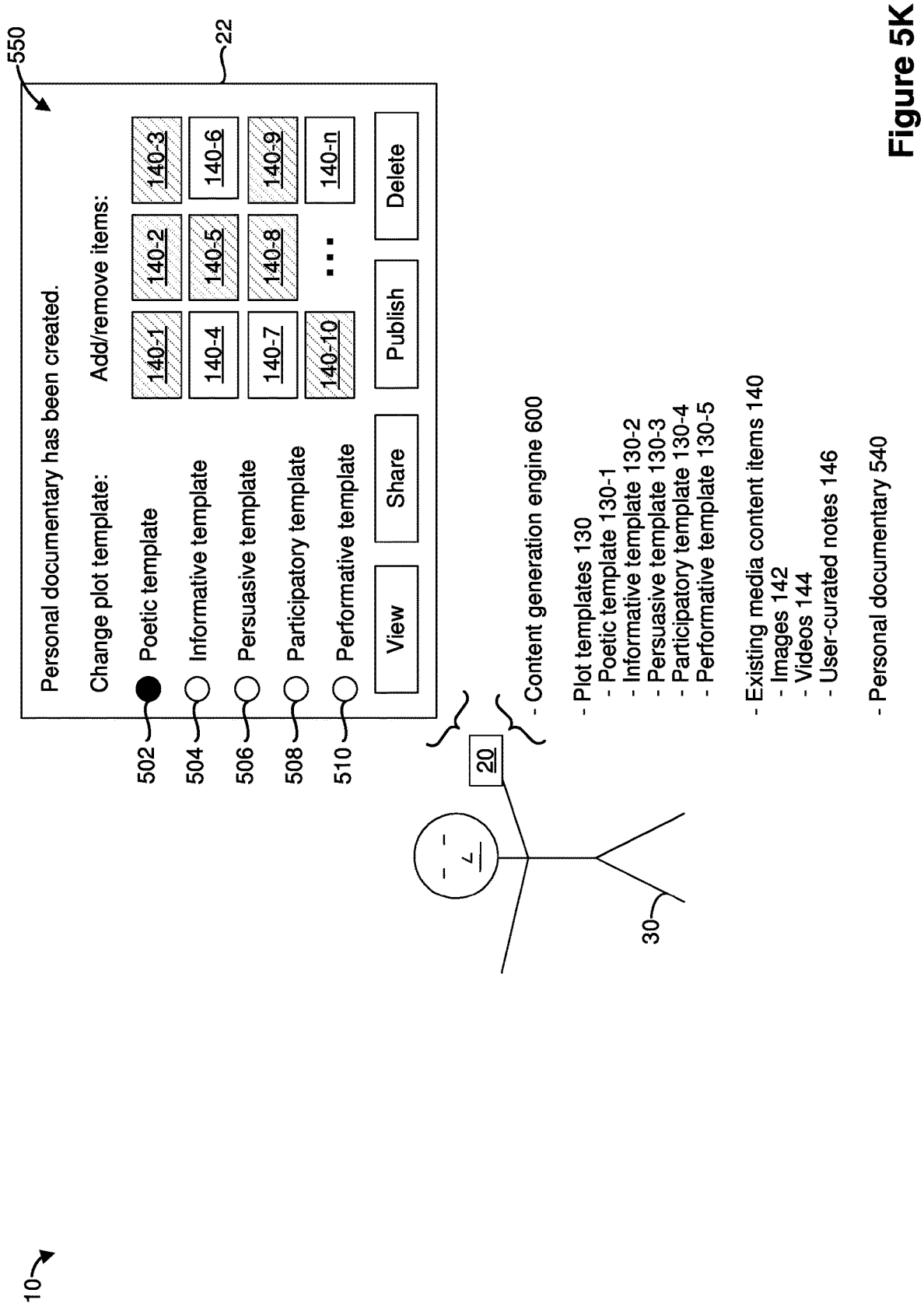

FIGS. 5J and 5K illustrate a sequence in which the content generation engine 600 automatically changes the underlying plot template 130 of the personal documentary 540 in response to detecting a request to modify the personal documentary 540. In some implementations, certain modifications to the personal documentary 540 trigger the content generation engine 600 to automatically change the underlying plot template 130 of the personal documentary 540. In the example of FIG. 5J, the electronic device 20 detects a user input 564 corresponding to a request to remove the second media content item 140-2 from the personal documentary 540.

As illustrated in FIG. 5K, in response to detecting the user input 564 shown in FIG. 5J, the content generation engine 600 removes the second media content item 140-2 from the personal documentary 540 and changes the underlying plot template 130 of the personal documentary 540 from the participatory template 130-4 to the poetic template 130-1. In some implementations, adding or removing media content items 140 from the personal documentary 540 causes the remaining media content items 140 integrated into the personal documentary 540 to be more closely associated with a different plot template 130. As such, the content generation engine 600 selects a different plot template 130 that more closely aligns with the remaining media content items 140 integrated into the personal documentary 540. In some implementations, changing the plot template 130 results in a different presentation of the remaining media content items 140 associated with the personal documentary 540. For example, in some implementations, changing the plot template 130 changes a sequence of the remaining media content items 140 in the personal documentary 540. In some implementations, changing the plot template 130 results in different portions of the remaining media content items 140 being included in the personal documentary 540. For example, switching from the participatory template 130-4 to the poetic template 130-1 triggers the content generation engine 600 to include portions of the remaining media content items 140 that convey facial expressions (e.g., instead of portions of the remaining media content items 140 that convey answers to questions associated with the participatory template 130-4).

Figure 5L:
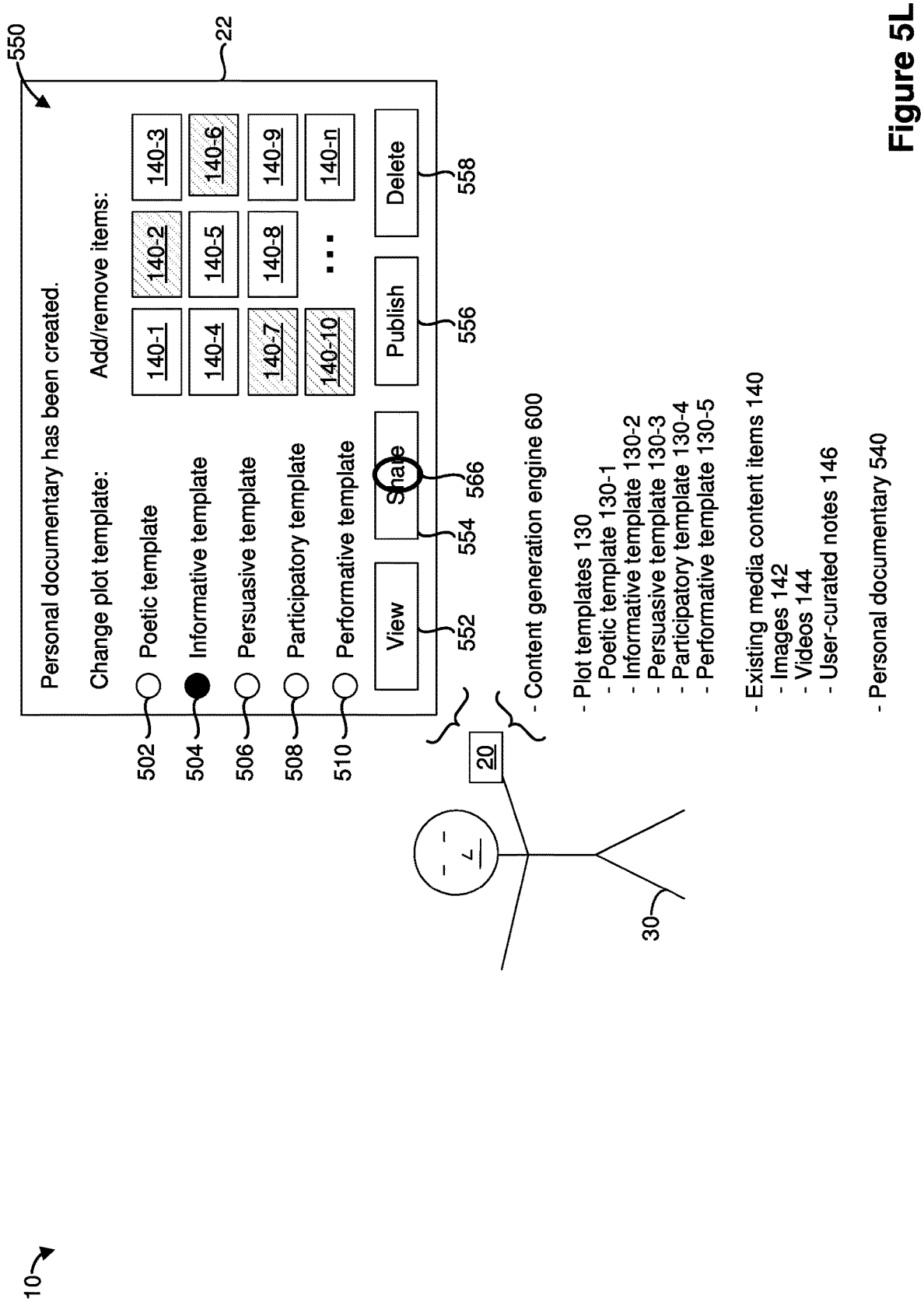

Referring to FIG. 5L, the electronic device 20 detects a user input 566 at a location corresponding to the share affordance 554. For example, the electronic device 20 detects a tap at the location corresponding to the share affordance 554.

Figure 5M:
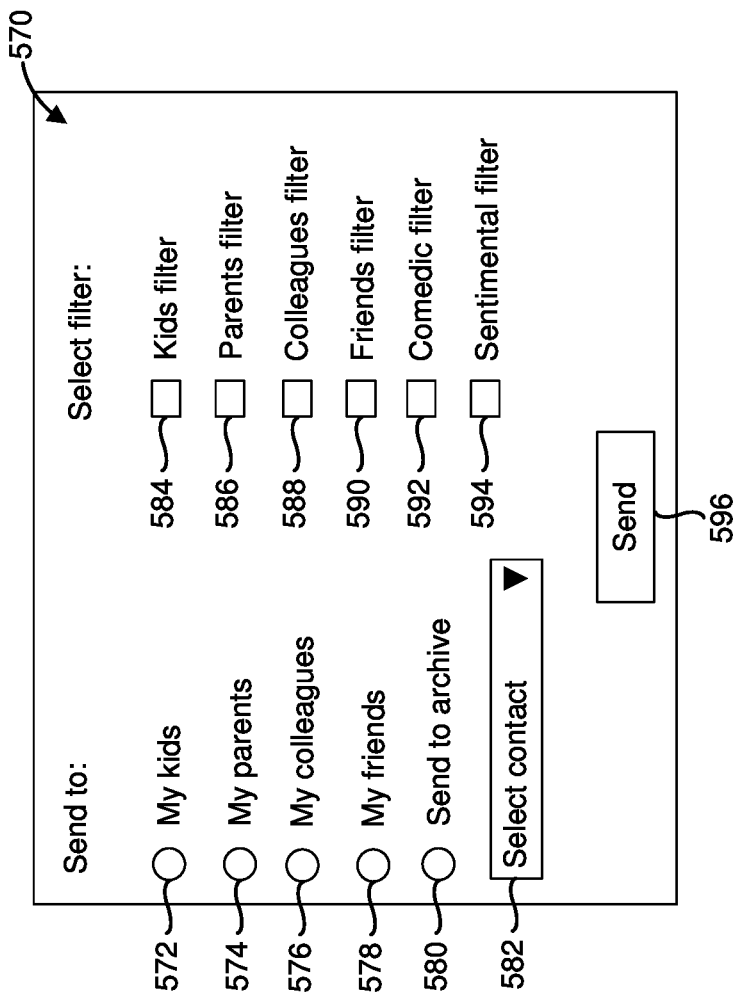

Referring to FIG. 5M, in some implementations, the electronic device 20 presents a share interface 570 in response to detecting the user input 566 directed to the share affordance 554. In some implementations, the share interface 570 allows the user 30 to select whom to share the personal documentary 540 with. In the example of FIG. 5M, the share interface 570 includes a kids affordance 572 for sharing the personal documentary 540 with kids of the user 30, a parents affordance 574 for sharing the personal documentary 540 with parents for the user 30, a colleagues affordance 576 for sharing the personal documentary 540 with colleagues of the user 30, a friends affordance 578 for sharing the personal documentary 540 with friends of the user 30, an archive affordance 580 for sending the personal documentary to an archive, and a contract dropdown 582 for sharing the personal documentary 540 with another contact of the user 30.

In some implementations, the share interface 570 allows the user 30 to customize the personal documentary 540, for example, so that the personal documentary 540 is more tailored to the person that the user 30 is sharing the personal documentary 540 with. In some implementations, the share interface 570 allows the user 30 to apply a set of one or more filters to the personal documentary 540 in order to make the personal documentary 540 more suitable for a contact with whom the user 30 is sharing the personal documentary 540. In the example of FIG. 5M, the share interface 570 includes a kid filter affordance 584 that, when selected, makes the personal documentary 540 more suitable for kids by applying a kid filter to the personal documentary 540. For example, selecting the kid filter affordance 584 results in filtering out of content from the personal documentary 540 that is unsuitable for kids (e.g., filtering out photos or videos that are not rated for kids).

In the example of FIG. 5M, the share interface 570 includes a parent filter affordance 586 that, when selected, makes the personal documentary 540 more suitable for parents by applying a parent filter to the personal documentary 540. For example, selecting the parent filter affordance 586 results in an increase in font sizes used in the personal documentary 540 so that text is more visible to parents who may be visually impaired.

In the example of FIG. 5M, the share interface 570 includes a colleague filter affordance 588 that, when selected, makes the personal documentary 540 more suitable for colleagues by applying a colleague filter to the personal documentary 540. For example, selecting the colleague filter affordance 588 filters out content (e.g., photos or videos) from the personal documentary 540 that the user 30 may have designated as private.

In the example of FIG. 5M, the share interface 570 includes a friend filter affordance 590 that, when selected, makes the personal documentary 540 more suitable for friends by applying a friend filter to the personal documentary 540. For example, selecting the friend filter affordance 590 applies a friendly tone to the personal documentary 540 (e.g., selecting the friend filter affordance 590 changes background music in the personal documentary 540 to music that the user 30 listens to with his/her friends).

In some implementations, the share interface 570 includes a set of one or more tonal filters that, when applied, change a tone of the personal documentary 540. In the example of FIG. 5M, the share interface 570 includes a comedic filter affordance 592 that, when applied, makes the personal documentary 540 more comedic by applying a comedic filter to the personal documentary 540 (e.g., by removing content that does not satisfy a comedy threshold and/or by adding content that satisfies the comedy threshold). In the example of FIG. 5M, the share interface 570 includes a sentimental filter affordance 594 that, when applied, makes the personal documentary 540 more sentimental by applying a sentimental filter to the personal documentary 540 (e.g., by removing content that does not satisfy a sentiment threshold and/or by adding content that satisfies the sentiment threshold). The share interface 570 includes a confirm affordance 596 for applying the selected filter(s) and sending a customized version (e.g., a filtered version) of the personal documentary 540 to the selected contact(s).

In some implementations, one or more filters are associated with particular contracts or particular types of contracts. In such implementations, the electronic device 20 automatically applies a particular filter when the user 30 requests to send the personal documentary 540 to a contact associated with that particular filter. As an example, the electronic device 20 automatically applies the kid filter when the user 30 selects the kids affordance 572. As such, in this example, the user 30 need not manually select the kid filter affordance 584 after selecting the kids affordance 572. Automatically applying a filter reduces the need for unnecessary user inputs corresponding to selecting a filter.

In some implementations, the electronic device 20 allows the user 30 to define the filters. For example, the electronic device 20 allows the user 30 to define how the personal documentary 540 is modified when the kid filter, parent filter, colleague filter and/or friend filter is applied to the personal documentary 540. In some implementations, the kid filter, the parent filter, the colleague filter and/or the friend filter include one or more of the tonal filters. For example, the user 30 can define the kid filter to include the comedic filter. As another example, the user 30 can define the parent filter to include the sentimental filter.

In some implementations, the filters include location-based filters. For example, the filters may include a first location-based filter (e.g., a New York filter) that, when applied, makes the personal documentary 540 more suitable for a first location associated with the first location-based filter (e.g., applying the New York filter modifies the personal documentary 540 so that the personal documentary 540 is more suitable for New Yorkers). As another example, the filters may include a second location-based filter (e.g., a California filter) that, when applied, makes the personal documentary 540 more suitable for a second location associated with the second location-based filter (e.g., applying the California filter modifies the personal documentary 540 so that the personal documentary 540 is more suitable for Californians).

In some implementations, the filters include a current events filter that, when applied, modifies the personal documentary 540 in order to make the personal documentary more relevant to current events. For example, if the usage of a particular phrase is considered inappropriate based on current events, applying the current events filter results in removal or replacement of that particular phrase from the personal documentary 540 in order to make the personal documentary 540 more relevant to the current events.

Figure 6:
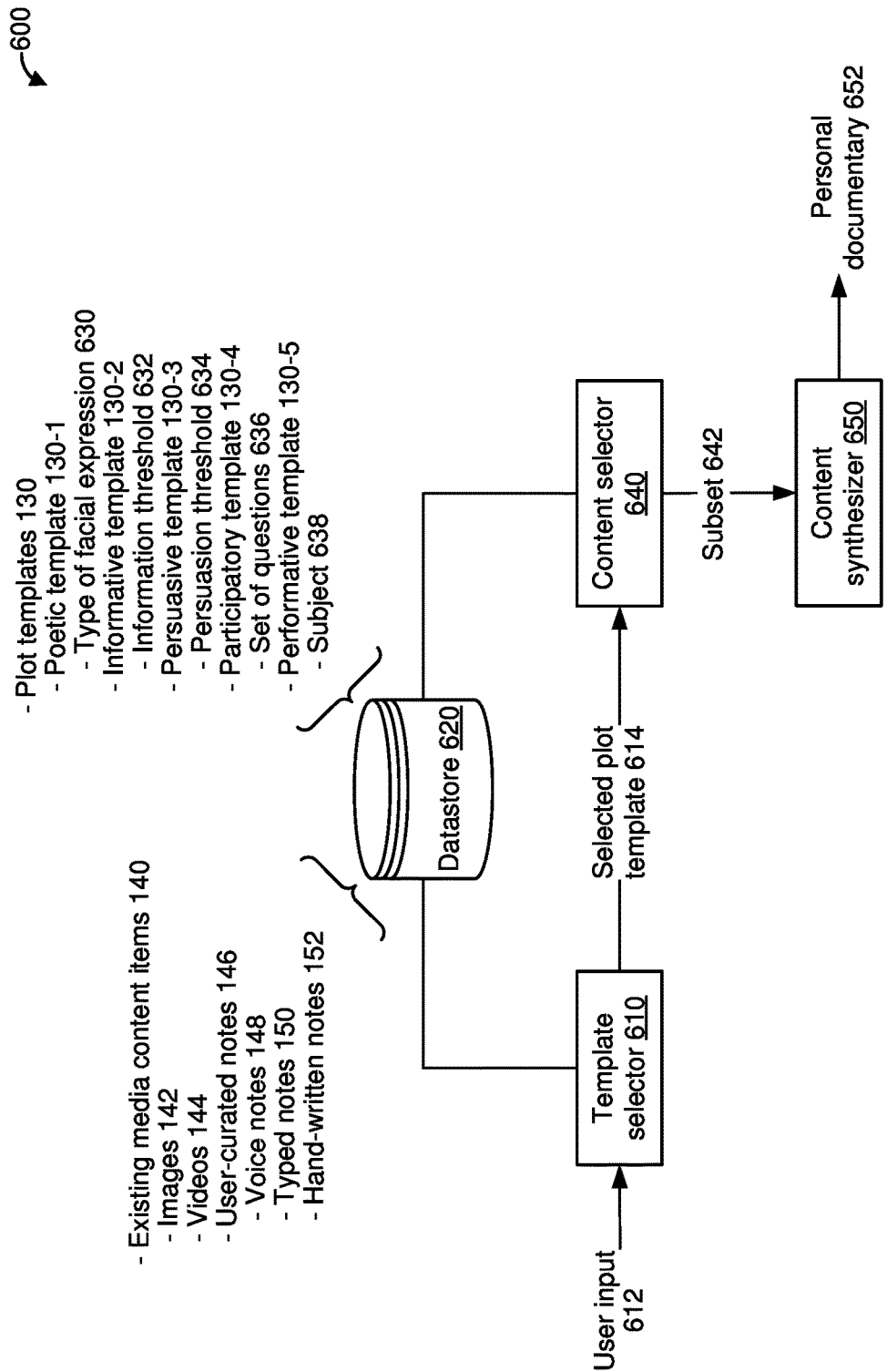
FIG. 6 is a block diagram of a system for generating content in accordance with some implementations.

FIG. 6 illustrates an example block diagram of the content generation engine 600. In some implementations, the content generation engine 600 includes a template selector 610, a datastore 620, a content selector 640 and a content synthesizer 650. In some implementations, the datastore 620 stores the existing media content items 140. In some implementations, the datastore 620 stores the plot templates 130.

In some implementations, the plot templates 130 are associated with respective criterion that specify types of media content items that the plot templates 130 use. In some implementations, the poetic template 130-1 is associated with a type of facial expression 630, and the content generation engine 600 populates the poetic template 130-1 with existing media content items 140 that exhibit the type of facial expression 630. In some implementations, the informative template 130-2 is associated with an information threshold 632, and the content generation engine 600 populates the informative template 130-2 with existing media content items 140 that satisfy the information threshold 632. In some implementations, the persuasive template 130-3 is associated with a persuasion threshold 634, and the content generation engine 600 populates the persuasive template 130-3 with existing media content items 140 that satisfy the persuasion threshold 634. In some implementations, the participatory template 130-4 is associated with a set of questions 636, and the content generation engine 600 populates the participatory template 130-4 with existing media content items 140 that provides answers to the set of questions 636. In some implementations, the performatory template 130-5 is associated with a subject 638, and the content generation engine 600 populates the performatory template 130-5 with existing media content items 140 that relate to the subject 638.

In various implementations, the template selector 610 selects one of the plot templates 130 in order to generate a personal documentary. In some implementations, the template selector 610 obtains a user input 612 that indicates a user selection of one of the plot templates 130. In such implementations, the template selector 610 selects a plot template indicated by the user input 612. In some implementations, the template selector 610 provides an indication of a selected plot template 614 to the content selector 640. In some implementations, the template selector 610 retrieves the selected plot template 614 from the datastore 620, and provides the selected plot template 614 to the content selector 640.

In various implementations, the content selector 640 populates the selected plot template 614 with a subset 642 of the existing media content items 140. In some implementations, the content selector 640 selects the subset 642 based on the selected plot template 614. In some implementations, the selected plot template 614 is the poetic template 130-1, and the content selector 640 selects the subset 642 such that the subset 642 includes existing media content items 140 that exhibit the type of facial expression 630. For example, in some implementations, the content selector 640 selects images 142 or videos 144 in which a facial expression of the user 30 matches the type of facial expression 630. In some implementations, the content selector 640 selects the subset 642 such that the subset 642 includes user-curated notes 146 that describe the user 30 having a feeling that corresponds to the type of facial expression 630. In some implementations, the poetic template 130-1 is associated with a type of feeling (e.g., happy, sad, overwhelmed, etc.), and the content selector 640 selects the subset 642 such that the subset 642 includes user-curated notes 146 that describe the user 30 having the type of feeling associated with the poetic template 130-1.

In some implementations, the selected plot template 614 is the informative template 130-2, and the content selector 640 selects the subset 642 such that the subset 642 includes existing media content items 140 that satisfy the information threshold 632. In some implementations, the information threshold 632 indicates particular types of information (e.g., numerical values such as dollar amounts, dates, locations, charts, etc.), and the content selector 640 selects the subset 642 such that the subset 642 includes existing media content items 140 that include the particular types of information. As an example, the user 30 may want to create an informative documentary that informs how the user 30 paid off his/her student loan debt. In this example, the content selector 640 selects the subset 642 such that the subset 642 includes existing media content items 140 that indicate the student loan amounts over a period of years.

In some implementations, the selected plot template 614 is the persuasive template 130-3, and the content selector 640 selects the subset 642 such that the subset 642 includes existing media content items 140 that satisfy the persuasion threshold 634. In some implementations, the persuasion threshold 634 indicates a set of persuasive phrases, and the content selector 640 selects the subset 642 such that the subset 642 includes existing media content items 140 that include at least some of the persuasive phrases.

In some implementations, the selected plot template 614 includes the participatory template 130-4, and the content selector 640 selects the subset 642 such that the subset 642 includes existing media content items 140 that provide answers to the set of questions 636. As an example, if the set of questions 636 are regarding why an event occurred, when an event occurred, or how an event occurred, the content selector 640 selects existing media content items 140 that provide answers as to why the event occurred, when the event occurred or how the event occurred.

In some implementations, the selected plot template 614 is the performatory template 130-5, and the content selector 640 selects the subset 642 such that the subset 642 includes existing media content items 140 that relate to the subject 638. As an example, if the subject 638 is climate change, the content selector 640 selects existing media content items 140 in which the user 30 is depicted as performing actions that contribute to slowing down climate change (e.g., images 142 or videos 144 of the user 30 insulating his/her home windows, switching to energy-efficient light bulbs, etc.).

In various implementations, the content selector 640 generates respective suitability scores for the existing media content items 140 in relation to a content selection criterion associated with the selected plot template 614. In some implementations, a suitability score for an existing media content item 140 indicates how suitable the existing media content item 140 is for the selected plot template 614. In some implementations, the content selector 640 selects existing media content items 140 with scores that are greater than a threshold score, and the content selector 640 forgoes selection of existing media content items 140 with scores that are lower than the threshold score. As an example, if the selected plot template 614 is the participatory template 130-4, the content selector 640 scores the existing media content items 140 based on whether the existing media content items 140 provide answers to the set of questions 636. In this example, existing media content items 140 that provide answers to the set of questions 636 are likely to have scores that are greater than a threshold score, and existing media content items 140 that do not provide answers to the set of questions 636 are likely to have scores that are less than the threshold score. As such, in this example, the content selector 640 selects existing media content items 140 that are likely to provide answers to the set of questions 636, and the content selector 640 forgoes selecting existing media content items 140 that are unlikely to provide answers to the set of questions 636.

In various implementations, the content synthesizer 650 generates a personal documentary 652 by populating the selected plot template 614 with the subset 642 of the existing media content items 140. For example, the content synthesizer 650 generates the personal documentary 540 shown in FIGS. 5E-5K. In some implementations, the content synthesizer 650 orders the subset 642 of the existing media content items 140 in a sequence based on the suitability scores of the existing media content items 140 in the subset 642. In some implementations, the existing media content items 140 in the subset 642 with suitability scores that are greater than a threshold are placed towards the beginning of the personal documentary 652, and the existing media content items 140 in the subset 642 with suitability scores that are less than the threshold are placed towards the end of the personal documentary 652. In some implementations, the existing media content items 140 in the subset 642 with suitability scores that are greater than a threshold are placed towards the beginning of the personal documentary 652 in order to serve as an introduction to the personal documentary 652 and towards the end of the personal documentary 652 in order to serve as a conclusion of the personal documentary 652, and the existing media content items 140 in the subset 642 with suitability scores that are less than the threshold are placed between the introduction and the conclusion.

In some implementations, the content synthesizer 650 includes a portion of the subset 642 in the personal documentary 652 (e.g., instead of including the entire subset 642 in the personal documentary 652). In some implementations, the content synthesizer 650 generates respective suitability scores for different portions of the subset 642 in relation to a selection criterion associated with the selected plot template 614. For example, the content synthesizer 650 generates respective suitability scores for different portions of a video 144 in relation to the persuasion threshold 634, and includes the most persuasive portions of the video 144 (e.g., portions that use persuasive language or depict persuasive actions) in the personal documentary 652 while forgoing inclusion of the least persuasive portions of the video 144 (e.g., portions that do not use persuasive language or do not depict persuasive actions).

Figure 7:
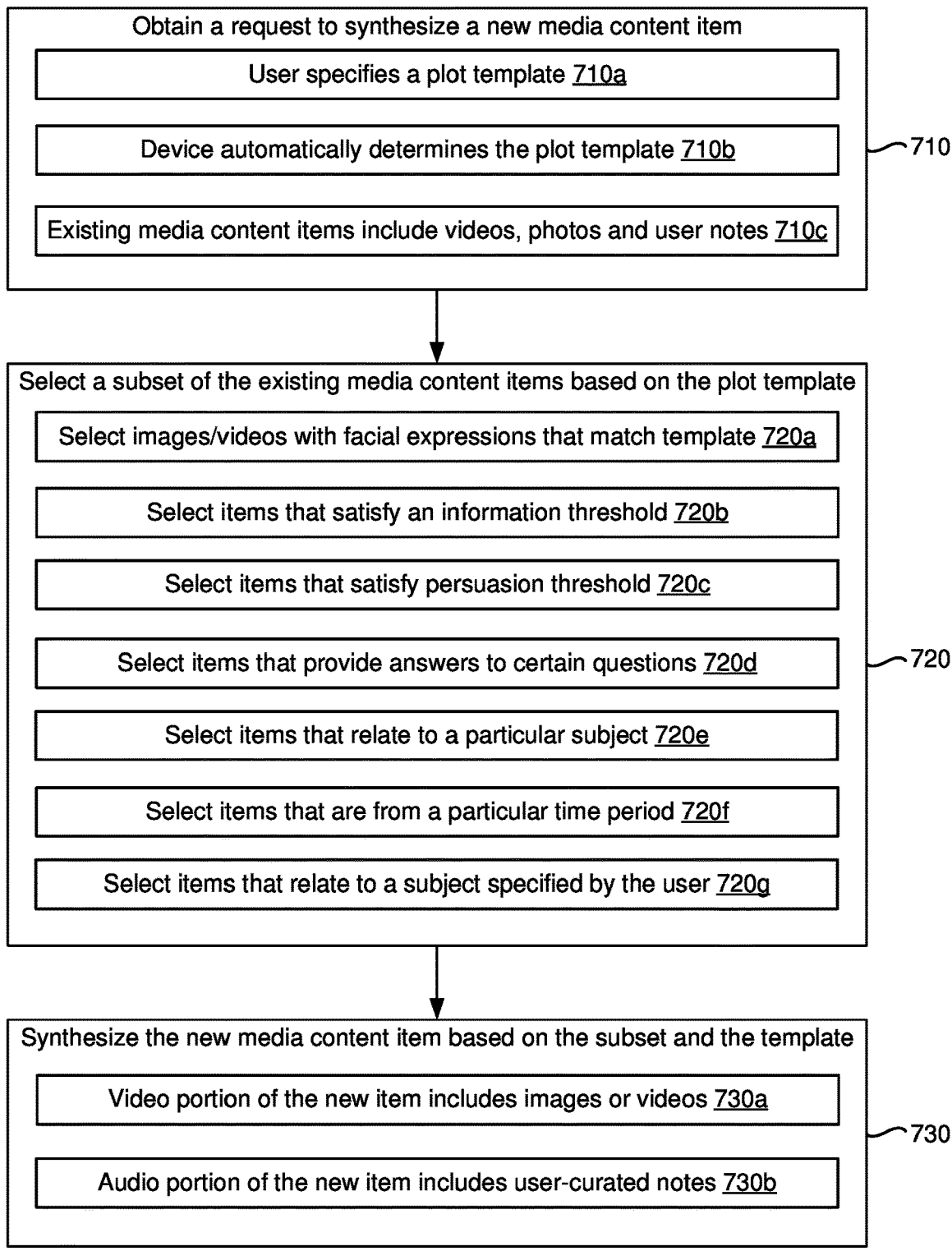
FIG. 7 is a flowchart representation of a method of generating content in accordance with some implementations.

FIG. 7 is a flowchart representation of a method 700 of generating a personal documentary in accordance with various implementations. In various implementations, the method 700 is performed by a device with one or more processors and a non-transitory memory (e.g., the electronic device 20 shown in FIGS. 5A-5K, and/or the content generation engine 600 shown in FIGS. 5A-6). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 710, in some implementations, the method 700 includes obtaining a request to synthesize a new media content item based on a plurality of existing media content items associated with a user of the device. For example, as shown in FIG. 5D, the electronic device 20 detects the user input 530 directed to the generate affordance 532. In some implementations, the request is associated with a plot template. For example, as shown in FIGS. 5A-5D, the user 30 has selected the informative template 130-2 for generating the personal documentary. In some implementations, the plurality of existing media content items includes personal media content items that the user has captured. For example, the plurality of existing media content items includes photos or videos of the user, or user-curated notes (e.g., voice notes, typed notes or handwritten notes). As such, in some implementations, the request includes a user request to create a personal documentary using the user's videos, photos and notes.

As represented by block 710a, in some implementations, the method 700 includes receiving a selection of the plot template from a plurality of plot templates. For example, as shown in FIG. 5D, the electronic device 20 detects the user input 530 that corresponds to a request to generate a personal documentary using the informative template 130-2. In some implementations, plot templates correspond to different types or genres of documentaries. For example, as shown in FIGS. 5A-5K, the plot templates 130 include a poetic template 130-1 for synthesizing a poetic documentary, an informative template 130-2 for synthesizing an informative documentary, a persuasive template 130-3 for synthesizing a persuasive documentary, a participatory template 130-4 for synthesizing a participatory documentary, a performatory template 130-5 for synthesizing a performative documentary, an expository documentary template for synthesizing an expository documentary, a observational documentary template for synthesizing an observational documentary, and a reflexive documentary template for synthesizing a reflexive documentary.

As represented by block 710b, in some implementations, the method 700 includes generating respective suitability scores for a plurality of plot templates based on the plurality of the existing media content items, and selecting the plot template from the plurality of plot templates based on the respective suitability scores. For example, in some implementations, the method 700 includes selecting the plot template with the greatest suitability score. More generally, in various implementations, the method 700 includes automatically selecting the plot template without requiring a user input that corresponds to the user manually selecting the plot template.

As represented by block 710c, in some implementations, the existing media content items include photos (e.g., the images 142 shown in FIGS. 5A-6). In some implementations, the existing media content items include videos (e.g., the videos 144 shown in FIGS. 5A-6). In some implementations, the existing media content items include user-curated notes (e.g., the user-curated notes 146 shown in FIGS. 5A-6). In some implementations, the user-curated notes include voice notes (e.g., the voice notes 148 shown in FIG. 5A), typed notes (e.g., the typed notes 150 shown in FIG. 5A) or hand-written notes (e.g., the hand-written notes 152 shown in FIG. 5A). In some implementations, the user-curated notes are stored in association with a note-taking application, a calendar application, an email application, or the like.

As represented by block 720, in some implementations, the method 700 includes selecting, based on the plot template, a subset of the plurality of existing media content items. For example, as shown in FIG. 6, the content selector 640 selects the subset 642 of the existing media content items 140 based on the selected plot template 614. As an example, if the user selects a poetic documentary template that focuses on capturing a feeling rather than facts, the device selects existing media content items that indicate a common feeling (e.g., happiness, triumph, etc.).

As represented by block 720a, in some implementations, the plot template is a poetic template that is associated with a type of facial expression, and selecting the subset of the plurality of existing media content items includes selecting images or videos in which a facial expression of the user of the device matches the type of facial expression associated with the plot template. As an example, if the user wants a poetic documentary which shows what a happy life the user has led, the device selects images or videos in which the facial expression of the user exhibits happiness (e.g., the device selects images or videos in which the user is smiling or laughing).

As represented by block 720b, in some implementations, the plot template is an expository template (e.g., an informative template) that is associated with an information threshold, and selecting the subset of the plurality of existing media content items includes selecting existing media content items that satisfy the information threshold. For example, as shown in FIG. 6, the plot templates 130 include an informative template 130-2 that is associated with an information threshold 632. As discussed in relation to FIG. 6, if the selected plot template 614 is the informative template 130-2, the content selector 640 selects the subset 642 such that the subset 642 includes existing media content items 140 that satisfy the information threshold 632.

In some implementations, the method 700 includes determining that a particular existing media content item satisfies the information threshold when a number of user-notes associated with that particular existing media content item exceeds a threshold number. For example, in some implementations, the device determines that a video or an image satisfies the information threshold, when the user wrote at least a sentence or two regarding the video or the image in the user's note application.

As represented by block 720c, in some implementations, the plot template is a persuasive template (e.g., an expository template) that is associated with a persuasion threshold, and selecting the subset of the plurality of existing media content items includes selecting existing media content items that satisfy the persuasion threshold. For example, as shown in FIG. 6, the plot templates 130 include a persuasive template 130-3 that is associated with a persuasion threshold 634. As discussed in relation to FIG. 6, if the selected plot template 614 is the persuasive template 130-3, the content selector 640 selects the subset 642 such that the subset 642 includes existing media content items 140 that satisfy the persuasion threshold 634.

In some implementations, the method 700 includes determining that a particular existing media content item satisfies the persuasion threshold when the particular existing media content item or a user-curated note associated with that particular existing media content item uses phrases that match a set of one or more persuasive phrases. For example, in some implementations, the device determines that a particular video is persuasive if the video uses phrases such as "firstly", "secondly", "because", "for these reasons", "on the whole", "I am certain", etc.

As represented by block 720d, in some implementations, the plot template is a participatory template that includes a set of one or more questions, and selecting the subset of the plurality of existing media content items includes selecting existing media content items that provide answers to the set of one or more questions. For example, as shown in FIG. 6, the plot templates 130 include a participatory template 130-4 that is associated with a set of questions 636. As discussed in relation to FIG. 6, if the selected plot template 614 is the participatory template 130-4, the content selector 640 selects the subset 642 such that the subset 642 includes existing media content items 140 that provide answers to the set of questions 636. In some implementations, the set of one or more questions may be generic questions such as why did an event occur, when did an event occur or how did an event occur. In some implementations, the method 700 includes selecting a user-curated note that answers the questions, and converts the text in the user-curated note to speech while displaying the user-curated note or an image that best matches the user-curated note.

As represented by block 720e, in some implementations, the plot template is a performatory template that is associated with a subject that satisfies a public awareness threshold, and selecting the subset of the plurality of existing media content items includes selecting existing media content items that relate to the subject. For example, as shown in FIG. 6, the plot templates 130 include a performatory template 130-5 that is associated with a subject 638. As discussed in relation to FIG. 6, if the selected plot template 614 is the performatory template 130-5, the content selector 640 selects the subset 642 such that the subset 642 includes existing media content items 140 that relate to the subject 638. In some implementations, a subject that satisfies public awareness threshold refers to a subject that the public at large is concerned about or is at least discussing via social network platforms. As an example, if the subject is climate change, the device selects media content items that depict the user's actions regarding climate change, for example, pictures of the user delivering a presentation on climate change, biking to work, etc.

As represented by block 720f, in some implementations, the request is associated with a time period, and selecting the subset of the plurality of existing media content items includes selecting existing media content items that correspond to the time period. As an example, if the user wants to generate a documentary that documents the calendar year 2019, the device utilizes media content items that were captured during the calendar year 2019.

As represented by block 720g, in some implementations, the request is associated with a particular subject, and selecting the subset of the plurality of existing media content items includes selecting existing media content items that relate to that particular subject. As an example, if the user wants to document their work with cars from the 1950s, the device utilizes media content items that show the user working on cars from the 1950s, or media content items that discuss the user thoughts on cars from the 1950s.

As represented by block 730, in some implementations, the method 700 includes synthesizing the new media content item by ordering the subset of the plurality of existing media content items in a sequence that satisfies the plot template. For example, the device synthesizes a personal documentary, for example, the personal documentary 540 shown in FIGS. 5E-5K, or the personal documentary 652 shown in FIG. 6. In some implementations, the method 700 includes generating the new media content item by populating the plot template with the subset of the plurality of existing media content items. For example, as discussed in relation to FIG. 6, the content synthesizer 650 synthesizes the personal documentary 652 by populating the selected plot template 614 with the subset 642 of the existing media content items 140. In various implementations, generating the new media content item enhances a user experience of the device by conveying a cohesive story that connects various existing media content items. In some implementations, generating the new media content item by automatically populating the plot template reduces the need for user inputs that correspond to the user manually generating the personal documentary. In various implementations, reducing unnecessary user inputs tends to enhance operability of the device, for example, by extending a battery-life of a battery-operated device.

As represented by block 730a, in some implementations, synthesizing the new media content item includes synthesizing a video portion of the new media content item by selecting a subset of existing images or videos that satisfy the plot template. For example, as discussed in relation to FIG. 6, in some implementations, the subset 642 includes some of the images 142 or some of the videos 144. As such, in some implementations, a visual portion of the personal documentary includes some of the images or videos that the user captured. In some implementations, the visual portion includes portions of user-curated notes.

As represented by block 730b, in some implementations, synthesizing the new media content item comprises synthesizing an audio portion of the new media content item by selecting a subset of user-curated notes that satisfy the plot template and outputting audio corresponding to the subset of user-curated notes. For example, the device selects some of the user-curated notes 146 shown in FIGS. 5A-6, and outputs speech corresponding to the selected user-curated notes 146. As such, the personal documentary is not limited to exhibiting images or videos captured by the user.

Figure 8:
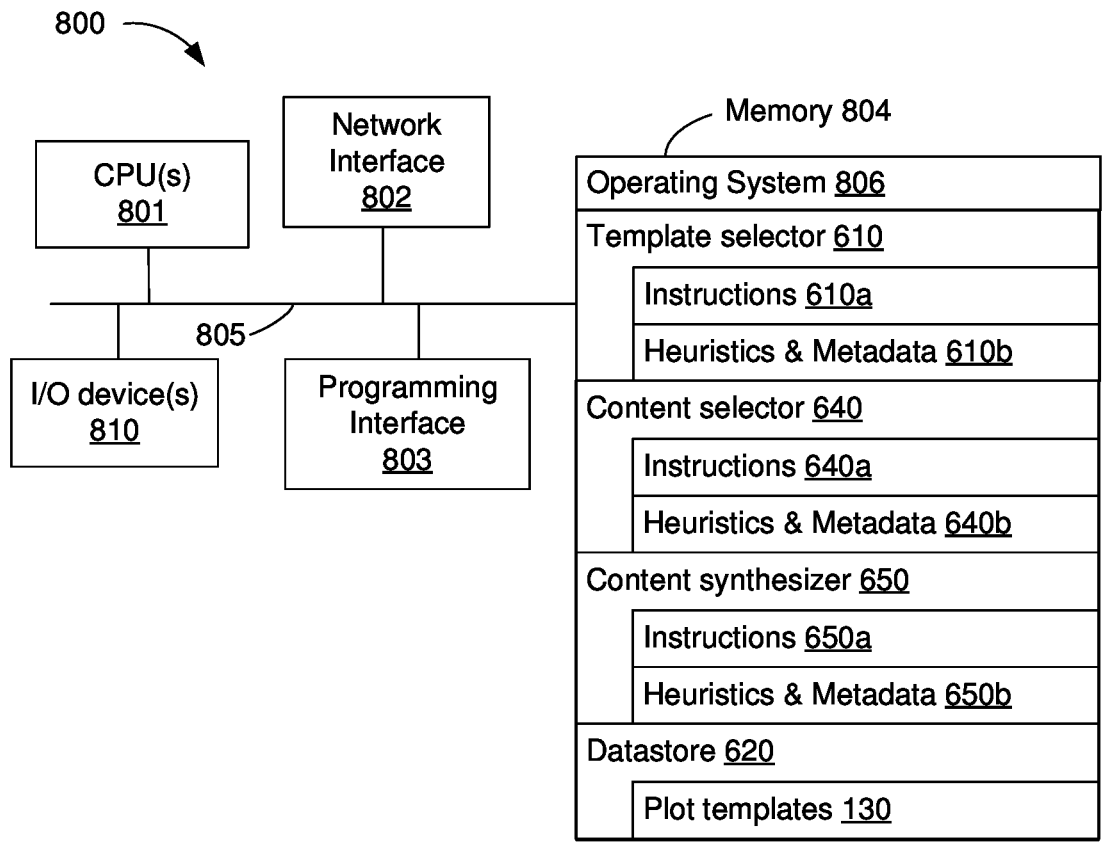
FIG. 8 is a block diagram of a device that generates content in accordance with some implementations.

FIG. 8 is a block diagram of a device 800 that generates a personal documentary. In some implementations, the device 800 implements the electronic device 20 shown in FIGS. 5A-5K, and/or the content generation engine 600 shown in FIGS. 5A-6. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the template selector 610, the datastore 620, the content selector 640, the content synthesizer 650. In various implementations, the device 800 performs the method 700 shown in FIG. 7.

In some implementations, the datastore 620 stores various plot templates 130. In some implementations, the datastore 620 stores existing media content items.

In some implementations, the template selector 610 selects a plot template for generating a personal documentary based on the existing media content items. In some implementations, the template selector 610 performs at least some of the operations represented by block 710 in FIG. 7. To that end, the template selector 610 includes instructions 610*a*, and heuristics and metadata 610*b*.

In some implementations, the content selector 640 selects a subset of the existing media content items for generating the personal documentary based on the plot template selected by the template selector 610. In some implementations, the content selector 640 performs the operation(s) represented by block 720 in FIG. 7. To that end, the content selector 640 includes instructions 640*a*, and heuristics and metadata 640*b*.

In some implementations, the content synthesizer 650 synthesizes a new media content item (e.g., a new personal documentary) by populating the plot template selected by the template selector 610 with the subset of existing media content items selected by the content selector. In some implementations, the content synthesizer 650 performs the operation(s) represented by block 730 in FIG. 7. To that end, the content synthesizer 650 includes instructions 650*a*, and heuristics and metadata 650*b*.

In various implementations, the one or more I/O devices 810 include an environmental sensor (e.g., an image sensor such as a camera, a depth sensor such as a depth camera and/or an audio sensor such as a microphone). In some implementations, the one or more I/O devices 810 include a display for displaying a personal documentary (e.g., the personal documentary 540 shown in FIGS. 5E-5K or the personal documentary 652 shown in FIG. 6). In some implementations, the one or more I/O devices 810 include a speaker for outputting audio corresponding to the personal documentary.

In various implementations, the one or more I/O devices 810 include a video pass-through display which displays at least a portion of a physical environment surrounding the device 800 as an image captured by a scene camera. In various implementations, the one or more I/O devices 810 include an optical see-through display which is at least partially transparent and passes light emitted by or reflected off the physical environment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, an environmental sensor, one or more processors and a non-transitory memory:
determining a plot template for generating a first media content item, wherein the plot template is associated with a list of images, videos or audio recordings for populating the plot template and wherein the plot template defines a conditional trigger for capturing a new media content item to be included in the first media content item that is being generated;
determining whether the conditional trigger is satisfied based on environmental data captured via the environmental sensor;
in response to the conditional trigger being satisfied, displaying, on the display, a notification to capture the new media content item for populating the plot template in order to generate the first media content item; and
updating the list after the new media content item is captured.

2. The method of claim 1, wherein the conditional trigger defines a temporal condition, and wherein the conditional trigger is satisfied when the temporal condition is satisfied based on a current time.

3. The method of claim 1, wherein the conditional trigger defines a spatial condition, and wherein the conditional trigger is satisfied when the spatial condition is satisfied based on a current location of the device.

4. The method of claim 1, wherein the conditional trigger is defined as the device being within a threshold distance of another device or a particular person, and wherein the conditional trigger is satisfied when the device is within the threshold distance of the other device or the particular person.

5. The method of claim 1, wherein the notification includes a prompt to capture an image or a video.

6. The method of claim 1, wherein the notification includes an affordance to capture the new media content item.

7. The method of claim 1, wherein displaying the notification includes displaying a graphical user interface (GUI) of a camera application.

8. The method of claim 7, wherein the conditional trigger specifies a camera setting for capturing the new media content item, and wherein displaying the notification includes setting values for GUI elements in the GUI based on the camera setting specified by the conditional trigger.

9. The method of claim 1, wherein displaying the notification comprises automatically capturing the new media content item and indicating that the new media content item has been captured.

10. The method of claim 9, wherein displaying the notification comprises displaying a first affordance to discard the new media content item that was captured automatically and a second affordance to store the new media content item in order to allow the new media content item to be used for populating the plot template.

11. The method of claim 1, further comprising detecting a user input corresponding to capturing the new media content item, and populating at least a portion of the plot template with the new media content item.

12. The method of claim 1, further comprising populating at least a portion of the plot template with one or more of the images, videos or audio recordings in the list and the new media content item, and generating the first media content item after the plot template has been populated.

13. The method of claim 1, further comprising displaying an affordance to request another device to send a second media content item that satisfies a second conditional trigger.

14. The method of claim 1, wherein determining the plot template comprises receiving a user input selecting the plot template from a plurality of plot templates.

15. The method of claim 1, wherein determining the plot template comprises selecting the plot template based on a calendar event.

16. A non-transitory memory storing one or more programs, which, when executed by one or more processors of a device including a display and an environmental sensor, cause the device to:
   determine a plot template for generating a first media content item, wherein the plot template is associated with a list of images, videos or audio recordings for populating the plot template and wherein the plot template defines a conditional trigger for capturing a new media content item;
   determine whether the conditional trigger is satisfied based on environmental data captured via the environmental sensor;
   in response to the conditional trigger being satisfied, display, on the display, a notification to capture the new media content item for populating the plot template in order to generate the first media content item; and
   update the list after the new media content item is captured.

17. The non-transitory memory of claim 16, wherein the conditional trigger defines a temporal condition, and wherein the conditional trigger is satisfied when the temporal condition is satisfied based on a current time.

18. The non-transitory memory of claim 16, wherein the conditional trigger defines a spatial condition, and wherein the conditional trigger is satisfied when the spatial condition is satisfied based on a current location of the device.

19. The non-transitory memory of claim 16, wherein the conditional trigger is defined as the device being within a threshold distance of another device or a particular person, and wherein the conditional trigger is satisfied when the device is within the threshold distance of the other device or the particular person.

20. The non-transitory memory of claim 16, wherein the notification includes a prompt to capture an image or a video.

21. The non-transitory memory of claim 16, wherein the notification includes an affordance to capture the new media content item.

22. The non-transitory memory of claim 16, wherein displaying the notification includes displaying a graphical user interface (GUI) of a camera application.

23. The non-transitory memory of claim 22, wherein the conditional trigger specifies a camera setting for capturing the new media content item, and wherein displaying the notification includes setting values for GUI elements in the GUI based on the camera setting specified by the conditional trigger.

24. The non-transitory memory of claim 16, wherein displaying the notification comprises automatically capturing the new media content item and indicating that the new media content item has been captured.

25. The non-transitory memory of claim 24, wherein displaying the notification comprises displaying a first affordance to discard the new media content item that was captured automatically and a second affordance to store the new media content item in order to allow the new media content item to be used for populating the plot template.

26. The non-transitory memory of claim 16, wherein the one or more programs further cause the device to detect a user input corresponding to capturing the new media content item, and populating at least a portion of the plot template with the new media content item.

27. The non-transitory memory of claim 16, wherein the one or more programs further cause the device to populate at least a portion of the plot template with one or more of the images, videos or audio recordings in the list and the new media content item, and generating the first media content item after the plot template has been populated.

28. The non-transitory memory of claim 16, wherein the one or more programs further cause the device to display an affordance to request another device to send a second media content item that satisfies a second conditional trigger.

29. The non-transitory memory of claim 16, wherein determining the plot template comprises receiving a user input selecting the plot template from a plurality of plot templates.

30. The non-transitory memory of claim 16, wherein determining the plot template comprises selecting the plot template based on a calendar event.

31. A device comprising:
   one or more processors;
   a non-transitory memory;
   an environmental sensor;

one or more displays; and one or more programs stored in the non-transitory memory, which, when executed by the one or more processors, cause the device to:

determine a plot template for generating a first media content item, wherein the plot template is associated with a list of images, videos or audio recordings for populating the plot template and wherein the plot template defines a conditional trigger for capturing a new media content item to be included in the first media content item that is being generated;

determine whether the conditional trigger is satisfied based on environmental data captured via the environmental sensor;

in response to the conditional trigger being satisfied, display, on the display, a notification to capture the new media content item for populating the plot template in order to generate the first media content item; and update the list after the new media content item is captured.

32. The device of claim 31, wherein the conditional trigger defines a temporal condition, and wherein the conditional trigger is satisfied when the temporal condition is satisfied based on a current time.

33. The device of claim 31, wherein the conditional trigger defines a spatial condition, and wherein the conditional trigger is satisfied when the spatial condition is satisfied based on a current location of the device.

34. The device of claim 31, wherein the conditional trigger is defined as the device being within a threshold distance of another device or a particular person, and wherein the conditional trigger is satisfied when the device is within the threshold distance of the other device or the particular person.

35. The device of claim 31, wherein the notification includes a prompt to capture an image, a video or an audio recording.

36. The device of claim 31, wherein the notification includes an affordance to capture the new media content item.

37. The device of claim 31, wherein displaying the notification includes displaying a graphical user interface (GUI) of a camera application.

38. The device of claim 37, wherein the conditional trigger specifies a camera setting for capturing the new media content item, and wherein displaying the notification includes setting values for GUI elements in the GUI based on the camera setting specified by the conditional trigger.

39. The device of claim 31, wherein displaying the notification comprises automatically capturing the new media content item and indicating that the new media content item has been captured.

40. The device of claim 39, wherein displaying the notification comprises displaying a first affordance to discard the new media content item that was captured automatically and a second affordance to store the new media content item in order to allow the new media content item to be used for populating the plot template.

41. The device of claim 31, wherein the one or more programs further cause the device to detect a user input corresponding to capturing the new media content item, and populating at least a portion of the plot template with the new media content item.

42. The device of claim 31, wherein the one or more programs further cause the device to populate at least a portion of the plot template with one or more of the images, videos or audio recordings in the list and the new media content item, and generating the first media content item after the plot template has been populated.

43. The device of claim 31, wherein the one or more programs further cause the device to display an affordance to request another device to send a second media content item that satisfies a second conditional trigger.

44. The device of claim 31, wherein determining the plot template comprises receiving a user input selecting the plot template from a plurality of plot templates.

45. The device of claim 31, wherein determining the plot template comprises selecting the plot template based on a calendar event.

\* \* \* \* \*